(12) United States Patent
Oguri et al.

(10) Patent No.: US 10,597,232 B2
(45) Date of Patent: Mar. 24, 2020

(54) SHEET BUNDLE CONVEYING APPARATUS

(71) Applicant: DUPLO SEIKO CORPORATION, Kinokawa-shi, Wakayama (JP)

(72) Inventors: Kazuhito Oguri, Kinokawa (JP); Tadahira Ohkochi, Kinokawa (JP)

(73) Assignee: Duplo Seiko Corporation, Kinokawa-shi, Wakayama (JP)

( * ) Notice: Subject to any disclaimer, the term of this patent is extended or adjusted under 35 U.S.C. 154(b) by 0 days.

(21) Appl. No.: 16/174,405

(22) Filed: Oct. 30, 2018

(65) Prior Publication Data

US 2019/0127151 A1     May 2, 2019

(30) Foreign Application Priority Data

Nov. 2, 2017    (JP) ................. 2017-213098

(51) Int. Cl.
  *B65G 15/46*     (2006.01)
  *B65H 31/30*     (2006.01)
  *B65H 31/34*     (2006.01)

(52) U.S. Cl.
  CPC ......... *B65G 15/46* (2013.01); *B65H 31/3036* (2013.01); *B65H 31/3081* (2013.01); *B65H 31/34* (2013.01); *B65G 2201/022* (2013.01); *B65H 2404/232* (2013.01); *B65H 2404/264* (2013.01)

(58) Field of Classification Search
  None
  See application file for complete search history.

(56) References Cited

U.S. PATENT DOCUMENTS

| | | | | |
|---|---|---|---|---|
| 2,484,845 A | * | 10/1949 | Nordquist | ........... B65H 9/04 271/240 |
| 2,528,106 A | * | 10/1950 | Albrecht | ........... B65H 9/101 271/240 |
| 4,029,194 A | | 6/1977 | Feurstein et al. | |
| 4,502,592 A | | 3/1985 | Ramcke | |

(Continued)

FOREIGN PATENT DOCUMENTS

| | | |
|---|---|---|
| GB | 1598964 A | 9/1981 |
| JP | 53119562 A | 10/1978 |

(Continued)

OTHER PUBLICATIONS

Search Report issued in European Patent Application No. 18203142.7-1017, dated Mar. 25, 2019 (9 pages).

*Primary Examiner* — William R Harp
(74) *Attorney, Agent, or Firm* — Buchanan Ingersoll & Rooney PC

(57) ABSTRACT

Conveying belts 1A and 1B have stopping members 6A and 6B. After a sheet bundle is placed on a placement area of the conveying belts, a driving control part controls a guide driving part 4 so that a regulating guide 2 sandwiches the sheet bundle from both sides in the width direction, controls a belt driving part 3 so that the stopping member 6B is made to abut on a first end surface of the sheet bundle and a second end surface is made to abut on the stopping member 1A, and thereafter, controls the driving parts 3 and 4 so that the sheet bundle is conveyed along the regulating guide 2 in a state of being sandwiched from the front and the back by the stopping members 6A and 6B.

17 Claims, 23 Drawing Sheets

(56) References Cited

U.S. PATENT DOCUMENTS

| | | | | |
|---|---|---|---|---|
| 5,749,455 A * | 5/1998 | Mizuta | ............... | B65G 17/26 198/626.5 |
| 6,293,544 B1 * | 9/2001 | Fedinatz | ............ | B65G 17/26 198/626.5 |
| 6,409,462 B2 * | 6/2002 | Newsome | ........ | B65G 21/2054 198/624 |
| 6,454,257 B1 * | 9/2002 | Cisar | ..................... | B65H 5/36 198/456 |
| 6,663,104 B2 * | 12/2003 | DaCunha | ............ | B41J 11/0055 271/221 |
| 7,588,239 B2 * | 9/2009 | Marcinik | ............ | B65H 31/40 198/412 |
| 7,942,398 B1 | 5/2011 | Marcinik | | |
| 2011/0139582 A1 | 6/2011 | Herrmann | | |

FOREIGN PATENT DOCUMENTS

| | | | |
|---|---|---|---|
| JP | 58148135 A | | 9/1983 |
| JP | 2003192213 A | | 7/2003 |

* cited by examiner

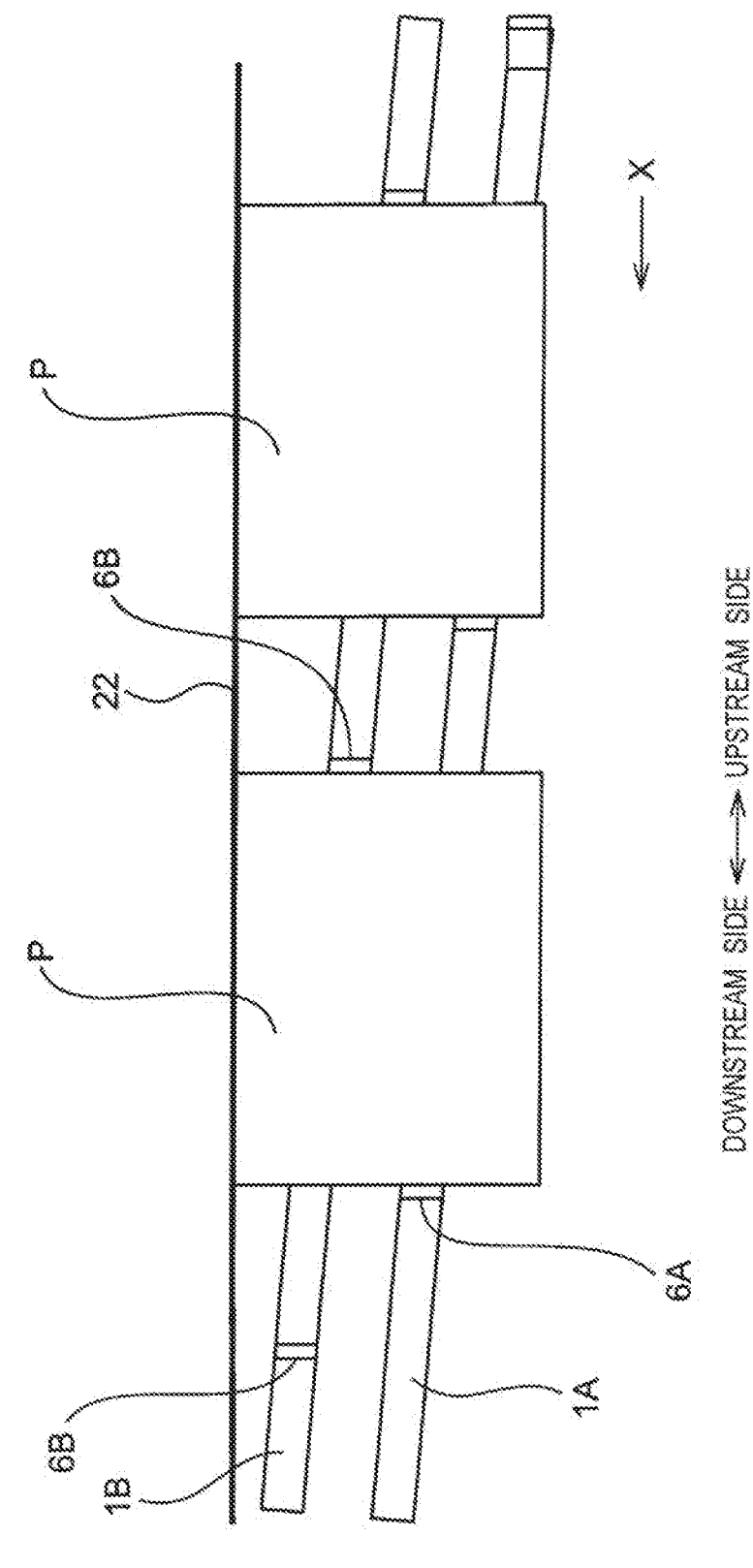

SHEET BUNDLE CONVEYING APPARATUS

BACKGROUND OF THE INVENTION

Technical Field

The present invention relates to a sheet bundle conveying apparatus that conveys a sheet bundle formed of a predetermined number of sheets.

Background Art

As apparatuses that convey a sheet bundle, for example, apparatuses described in Patent Documents 1 to 3 are known. The apparatus of Patent Document 1 conveys a sheet bundle while sandwiching it between stopping members on a conveying belt. The apparatus of Patent Document 2 conveys a sheet bundle while sandwiching it between abutting parts on conveying belts. The apparatus of Patent Document 3 conveys a sheet bundle while pressing it by a sheet end pressing member on a conveying belt.

PRIOR ART REFERENCES

Patent Documents

[Patent Document 1] JP S53-119562 A
[Patent Document 2] JP S58-148135 A
[Patent Document 3] JP 2003-192213 A

SUMMARY OF THE INVENTION

Problem to be Solved by the Invention

However, in the apparatus of Patent Document 1, since the distance between the stopping members is uniformly set, it is difficult to place the sheet bundle between the stopping members. In the apparatus of Patent Document 2, since three or more conveying belts are necessary and further, the positional relationship among the abutting parts on the conveying belts are fixed, it is difficult to place the sheet bundle on a predetermined place. In the apparatus of Patent Document 3, since the sheet bundle is only conveyed while being pressed by the sheet end pressing member, collapse of the sheet bundle at the time of conveyance, particularly, at the time of deceleration of conveyance cannot be resolved. Further, in the apparatuses of Patent Documents 1 to 3, the sheet bundle cannot be aligned in a direction orthogonal to the conveyance direction (that is, the width direction).

An object of the present invention is to provide a sheet bundle conveying apparatus capable of preventing a sheet bundle from collapsing at the time of deceleration of conveyance and of conveying the sheet bundle in a state of being aligned in the conveyance direction and in the width direction.

Means for Solving the Problem

The present invention is a sheet bundle conveying apparatus (10) that conveys a sheet bundle (P) formed of a predetermined number of sheets (100), the apparatus (10) comprising:

a plurality of conveying belts (1) juxtaposed so that the sheet bundle (P) is conveyed while being placed thereon;

a regulating guide (2) that is movable so as to sandwich the sheet bundle (P) placed on the conveying belts (1) from both sides in a direction orthogonal to a conveyance detection;

a belt driving part (3) that drives the conveying belts (1);

a guide driving part (4) that drives the regulating guide (2); and a driving control part that controls the belt driving part (3) and the guide driving part (4), wherein the conveying belts (1) have stopping members (6A, 6B) having a form abuttable on a first end surface (P11) on an upstream side and/or a second end surface (P12) on a downstream side in the conveyance direction of the sheet bundle (P) being placed, and have a placement area (S) for the sheet bundle (P) on the upstream side and/or the downstream side of the stopping members (6A, 6B), and (I) when the sheet bundle (P) is placed on the placement area (S), the driving control part controls the belt driving part (3) so that the conveying belts (1) move so as to bring the stopping members (6A, 6B) to predetermined positions, respectively, (II) after the sheet bundle (P) is placed on the placement area (S), the driving control part (a) controls the guide driving part (4) so that the regulating guide (2) sandwiches the sheet bundle (P) from both sides in the orthogonal direction and (b) controls the belt driving part (3) so that at least one of the conveying belts (1A, 1B) is moved to make the stopping members (6A, 6B) of the conveying belt (1A, 1B) abut on the first end surface (P11) or the second end surface (P12) of the sheet bundle (P) and at the same time or thereafter, make the second end surface (P12) or the first end surface (P11) of the sheet bundle (P) abut on the stopping member (6B, 6A) of the other of the conveying belts (1B, 1A), and (III) the driving control part controls the belt driving part (3) and the guide driving part (4) so that the sheet bundle (P) is conveyed along the regulating guide (2) with the stopping members (6A, 6B) abutting on the first end surface (P11) and the second end surface (P12) as in the above (II).

Effect of the Invention

According to the present invention, since the sheet bundle is conveyed in a state of being sandwiched from the front and the back by the stopping members, the sheet bundle is prevented from collapsing at the time of deceleration of conveyance. Further, since the sheet bundle can be aligned in the front-back direction by the stopping members and can be aligned in the right-left direction by the regulating guide, the sheet bundle can be aligned in the front-back and right-left directions.

BRIEF DESCRIPTION OF THE DRAWINGS

FIG. 25 is a view viewed in the direction of the arrow XXV of FIG. 24.

DETAILED DESCRIPTION

First Embodiment

Figure 1:
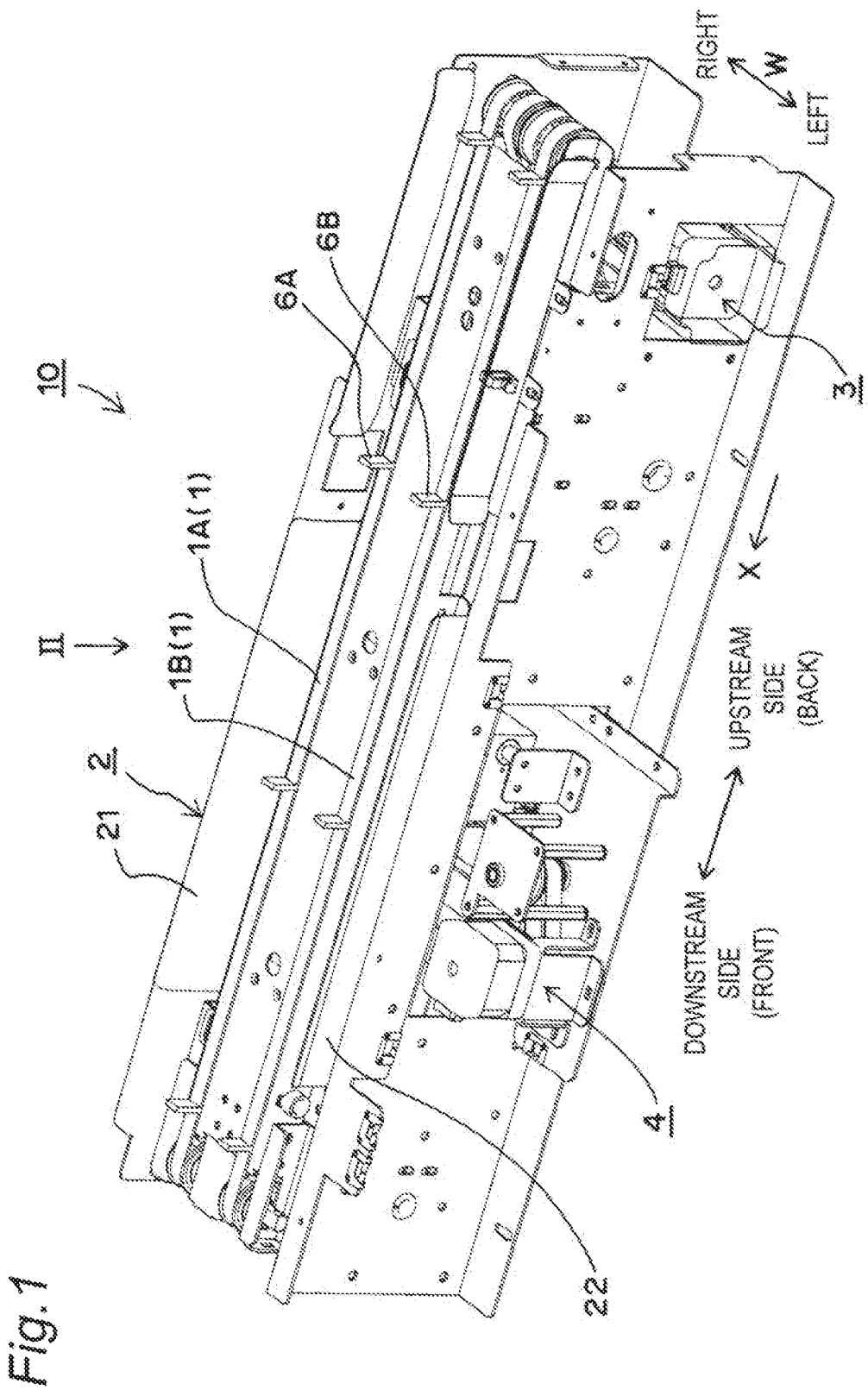
FIG. 1 is an upper perspective view of a sheet bundle conveying apparatus of a first embodiment of the present invention.
Figure 2:
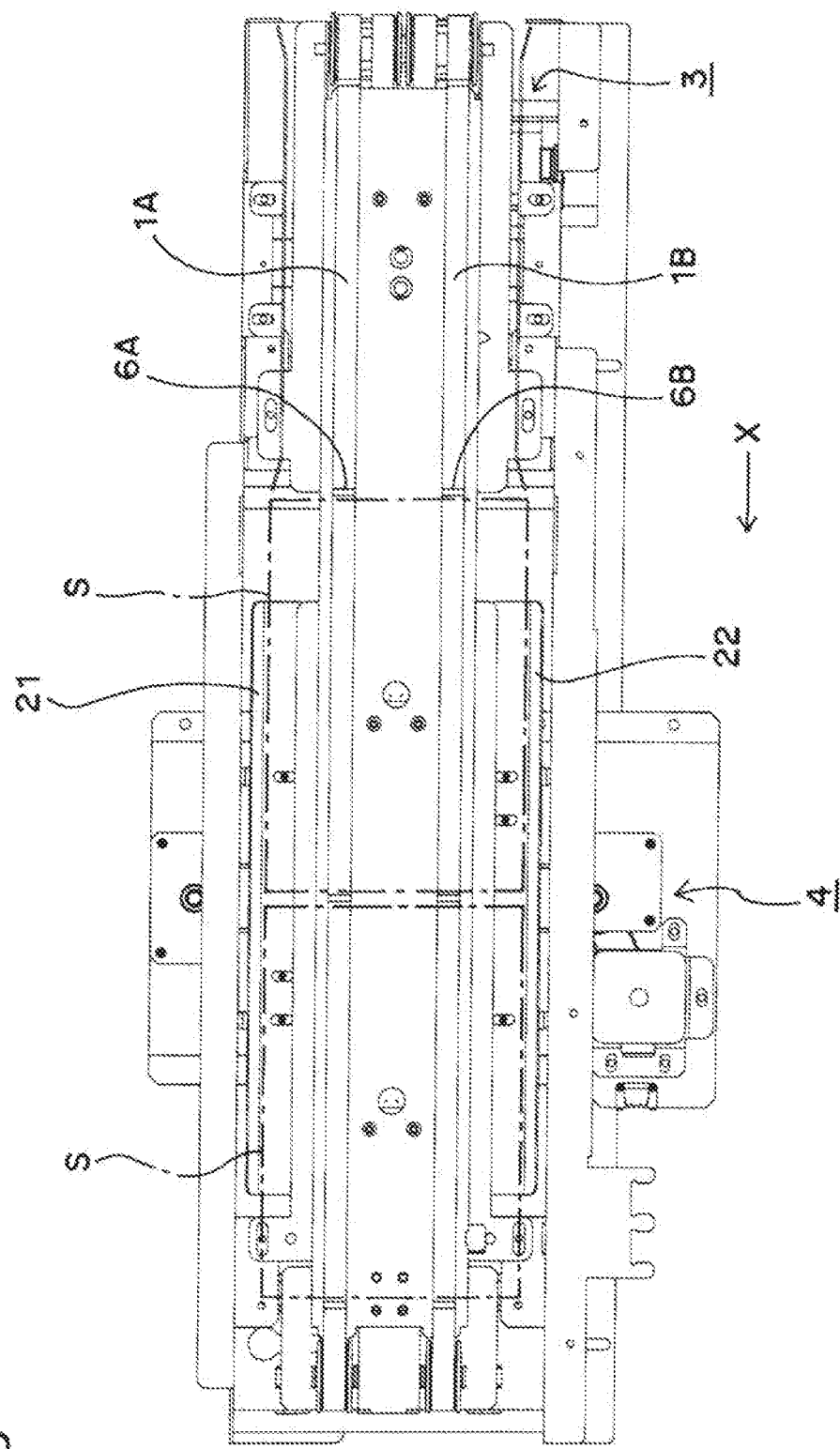
FIG. 2 is a view viewed in the direction of the arrow II of FIG. 1 (plan view)

FIG. 1 is an upper perspective view of a sheet bundle conveying apparatus of an embodiment of the present invention. FIG. 2 is a view viewed in the direction of the arrow II of FIG. 1 (plan view). This apparatus 10 is provided with: two conveying belts 1 juxtaposed so that a sheet bundle is conveyed while being placed thereon; a regulating guide 2 that is movable so as to sandwich the sheet bundle placed on the conveying belts 1 from both sides in a direction W orthogonal to a conveyance direction X; a belt driving part 3 that drives the conveying belts 1; a guide driving part 4 that drives the regulating guide 2; and a driving control part (not shown) that controls the belt driving part 3 and the guide driving part 4. In the following, the "conveyance direction X" is a direction from the upstream side toward the downstream side, the "front-back direction" is a direction with the downstream side as the "front", the "width direction" is the direction W orthogonal to the conveyance direction X, and the "right-left direction" is a width direction when the downstream side is viewed from the upstream side.

Conveying Belts and Belt Driving Part

Figure 3:
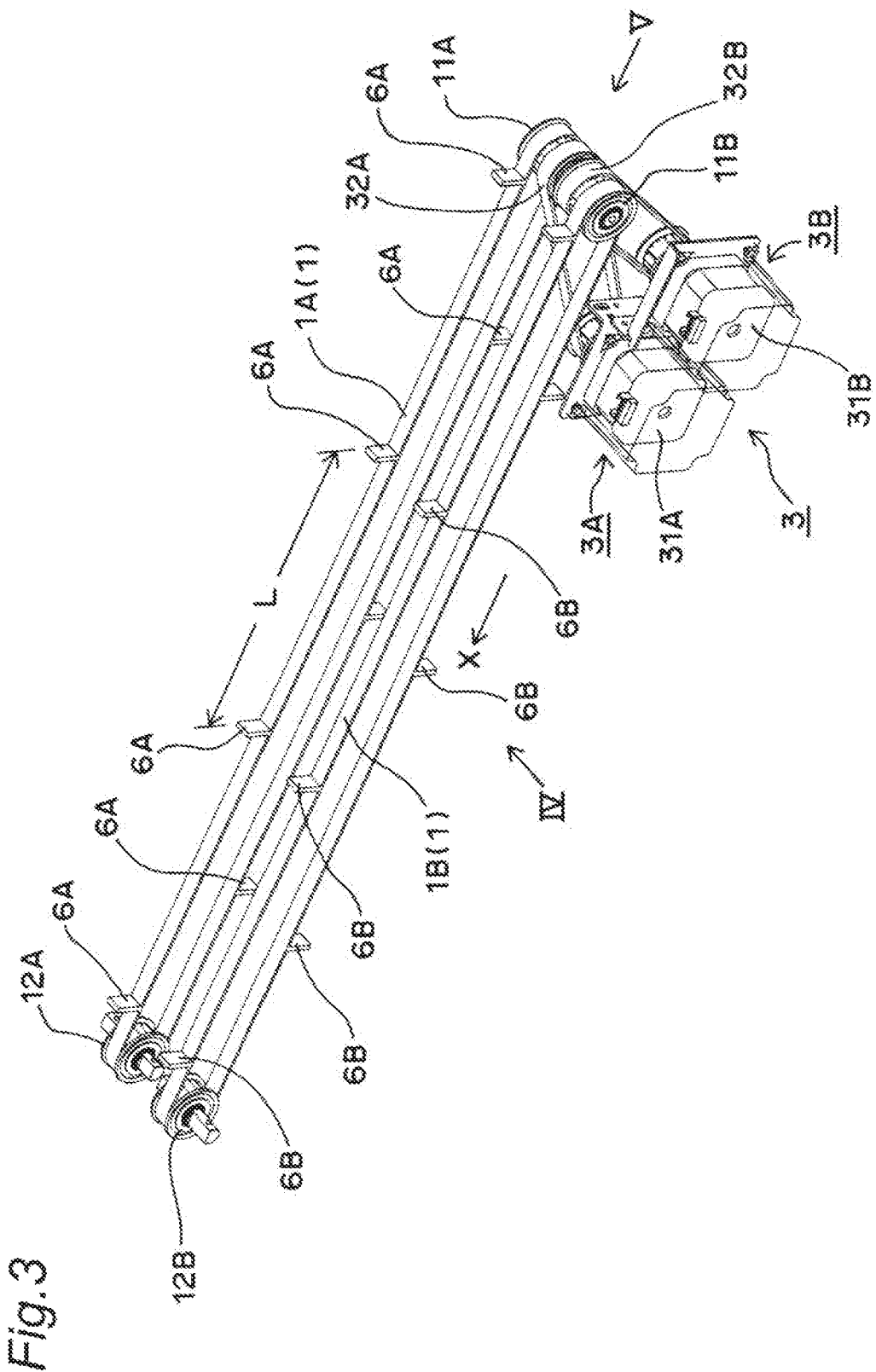
FIG. 3 is an upper perspective view showing only conveying belts and a belt driving part.
Figure 4:
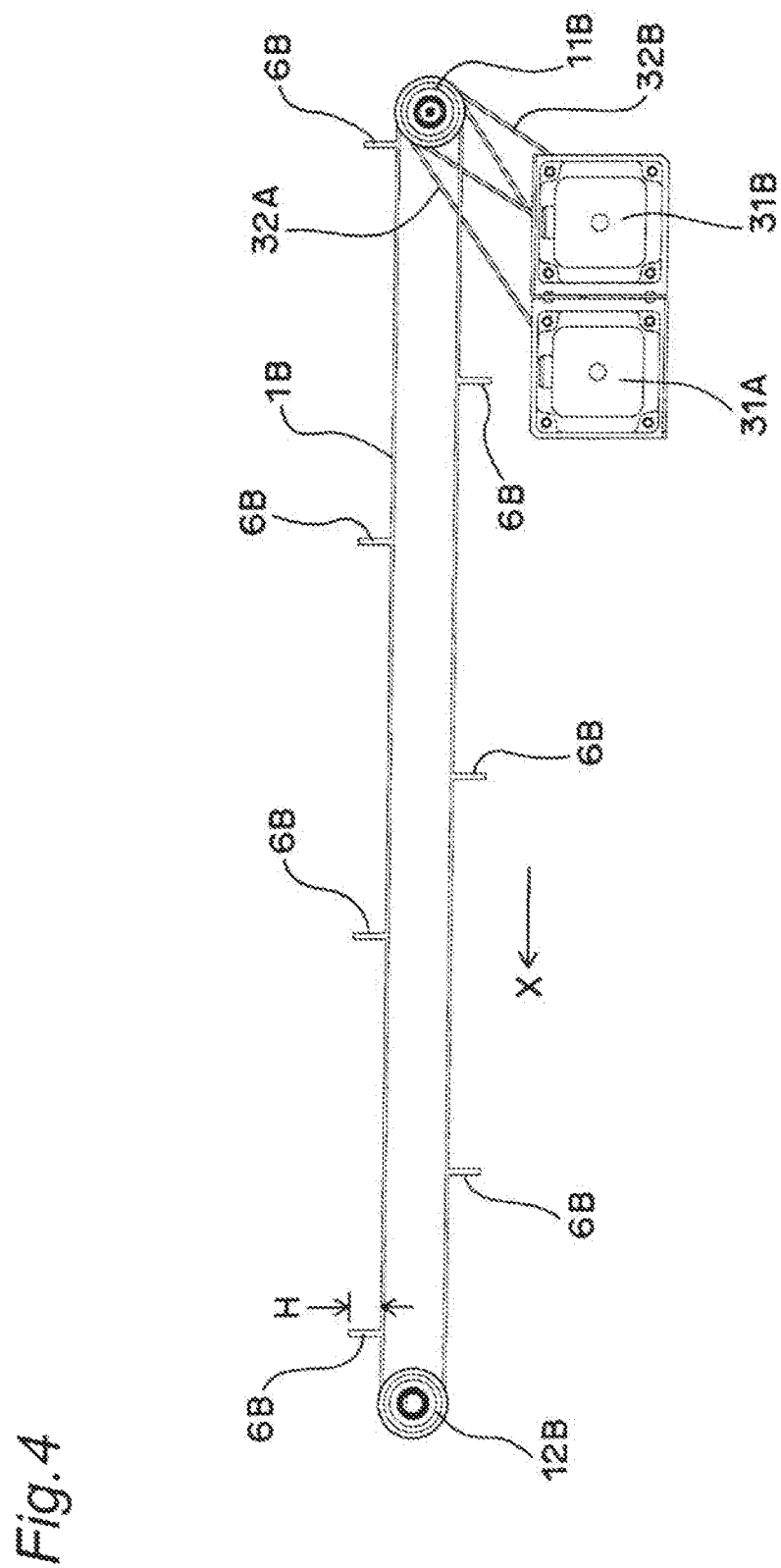
FIG. 4 is a view viewed in the direction of the arrow IV of FIG. 3.
Figure 5:
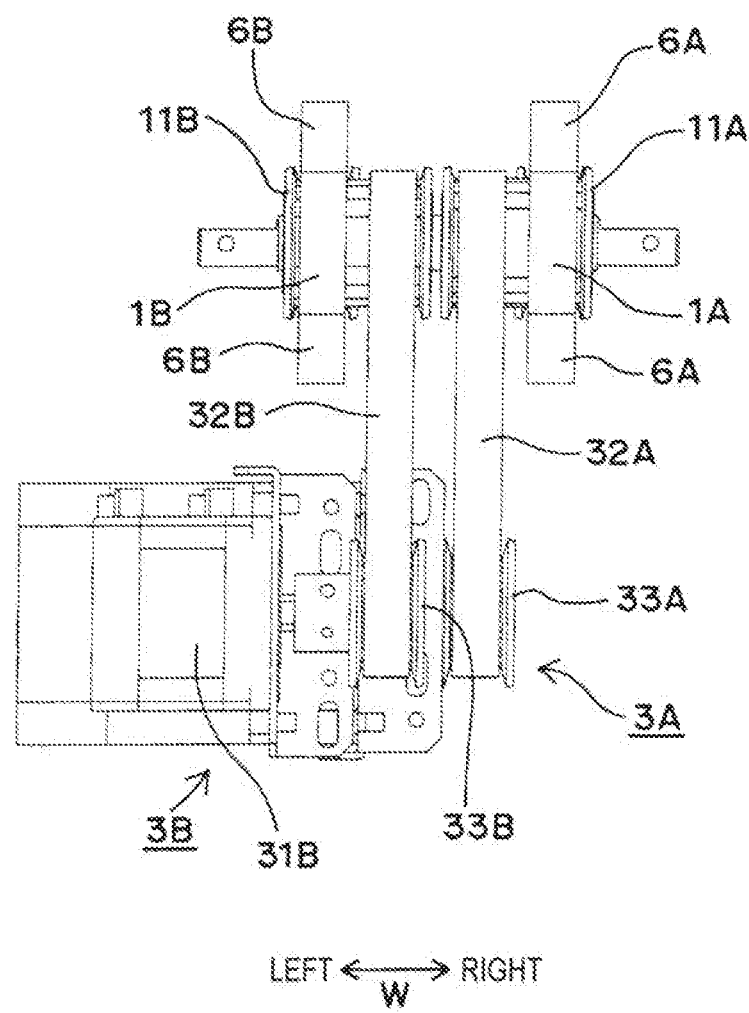
FIG. 5 is a view viewed in the direction of the arrow V of FIG. 3.

FIG. 3 is an upper perspective view showing only the conveying belts 1 and the belt driving part 3. FIG. 4 is a view viewed in the direction of the arrow IV of FIG. 3. FIG. 5 is a view viewed in the direction of the arrow V of FIG. 3.

The conveying belts 1 which include a right side conveying belt 1A and a left side conveying belt 1B are endless annular belts and extend in the conveyance direction X. The right side conveying belt 1A is wound around a roller 11A disposed at the upstream end in the conveyance direction X and a roller 12A disposed at the downstream end. The left side conveying belt 1B is wound around a roller 11B disposed at the upstream end in the conveyance direction X and a roller 12B disposed at the downstream end. The roller 11A and the roller 11B are aligned on the same line in the width direction W. The roller 12A and the roller 12B are aligned on the same line in the width direction W.

The belt driving part 3 has a right belt driving part 3A that drives the conveying belt 1A and a left belt driving part 3B that drives the conveying belt 1B. The right belt driving part 3A has a motor 31A and a driving belt 32A, and the driving belt 32 is wound around a drive shaft 33A of the motor 31A and the roller 11A. The left belt driving part 3B has a motor 31B and a driving belt 32B, and the driving belt 32B is wound around a drive shaft 33B of the motor 31B and the roller 11B.

The conveying belt 1A has a plurality of stopping members 6A protruding from the surface. In this example, seven stopping members 6A are provided. The stopping members 6A are all evenly spaced, and the distance L between the adjoining stopping members 6A is set to be slightly longer than the front-back length of the sheet bundle. The stopping members 6A have a plate-like form where an upstream side end surface 61A and a downstream side end surface 62A are both flat surfaces. The protrusion height H of the stopping members 6A is set to be slightly larger than the thickness of the sheet bundle. The conveying belt 1B has stopping members 6B like the stopping members 6A of the conveying belt 1A. The stopping members 6B have the same structure and protrusion height H as the stopping members 6A.

Regulating Guide and Guide Driving Part

Figure 6:
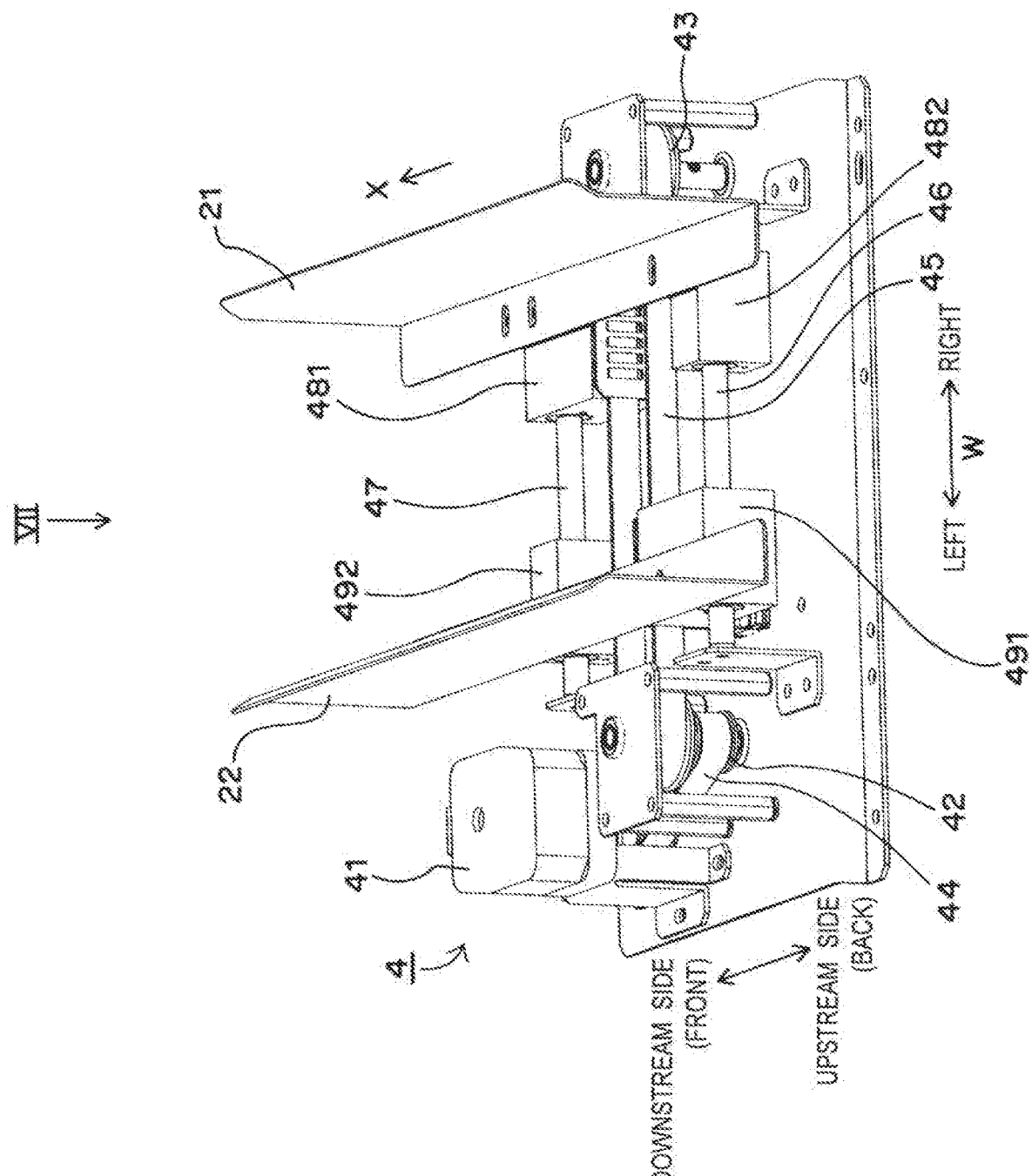
FIG. 6 is an upper perspective view showing only a regulating guide and a guide driving part.
Figure 7:
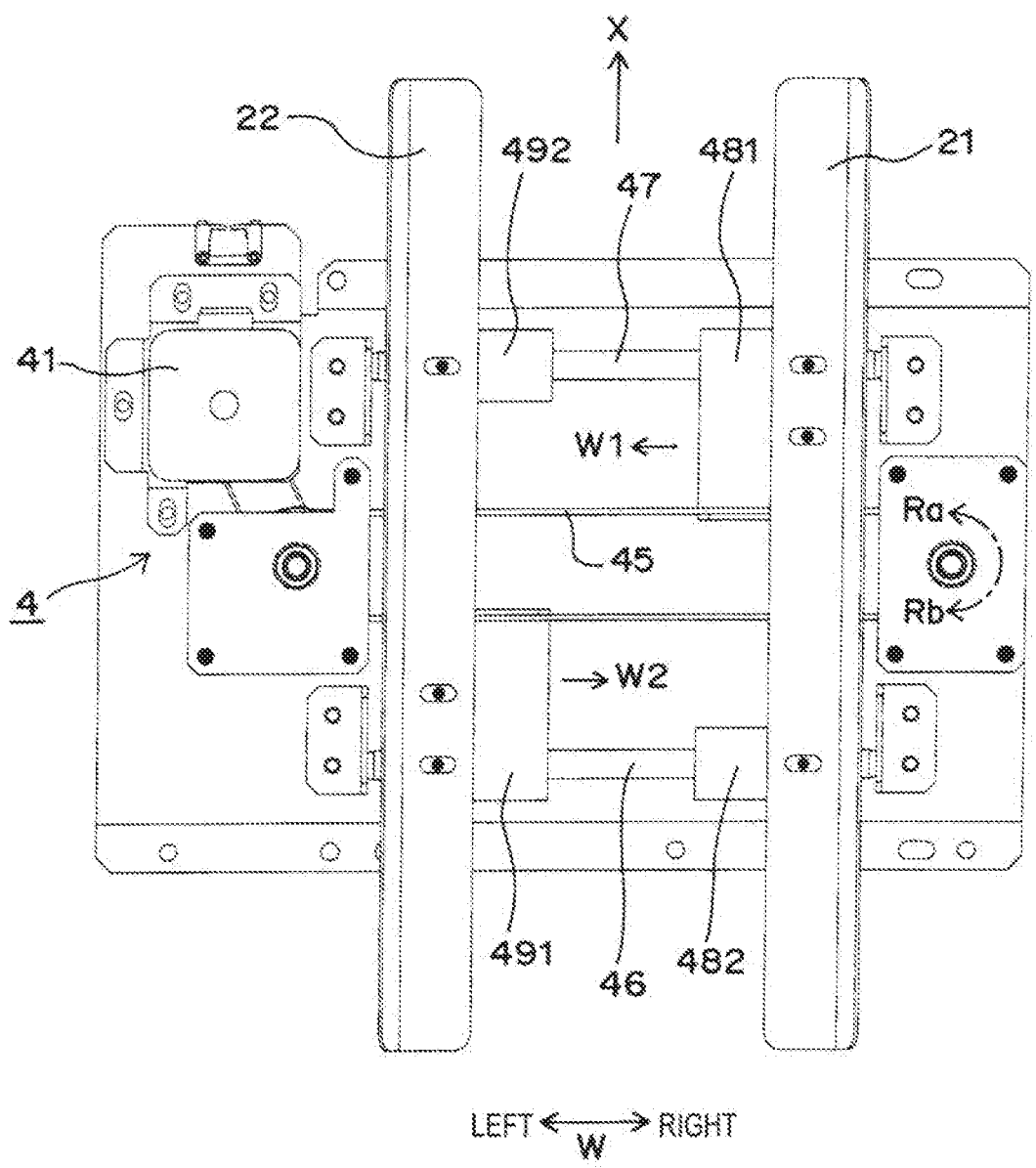
FIG. 7 is a view viewed in the direction of the arrow VII of FIG. 6 (plan view)

FIG. 6 is an upper perspective view showing only the regulating guide 2 and the guide driving part 4. FIG. 7 is a view viewed in the direction of the arrow VII of FIG. 6 (plan view).

The regulating guide 2 has two guide plates 21 and 22 which are disposed on both sides in the width direction of the conveying belts 1 and are facing each other in the width direction. The guide plates 21 and 22 extend in the conveyance direction X and are parallel to each other.

The guide driving part 4 has: a motor 41; rollers 42 and 43 disposed on both sides in the width direction of the conveying belts 1; a driving belt 44 wound around the drive shaft of the motor 41 and the roller 42; a belt 45 wound around the roller 42 and the roller 43; two slide bars 46 and 47 disposed in the width direction on the upstream side and the downstream side with respect to the belt 45; two sliders 481 and 482 to which the guide plate 21 is fixed; and two sliders 491 and 492 to which the guide plate 22 is fixed. The guide driving part 4 is disposed below the conveying belts 1A and 1B. The slider 481 which is situated on the downstream side is attached to the slide bar 47 and fixed to the belt 45. The slider 482 which is situated on the upstream side is attached to the slide bar 46. The slider 491 which is situated on the upstream side is attached to the slide bar 46 and fixed to the belt 45. The slider 492 which is situated on the downstream side is fixed to the slide bar 47. At the guide driving part 4, when the motor 41 rotates in the forward direction, the roller 42 rotates through the driving belt 44 and along therewith, the belt 45 rotates in an Ra direction, so that the slider 481 moves in a W1 direction and the slider 491 moves in a W2 direction. Thereby, the guide plates 21 and 22 both move in directions that make them approach each other. At the guide driving part 4, when the motor 41 rotates in the reverse direction, the belt 45 rotates in an Rb direction, so that the guide plates 21 and 22 move in directions that make them away from each other.

Driving Control Part

The driving control part (not shown) operates as follows;

(1) First, when a sheet bundle is placed on the conveying belts 1A and 1B, as shown in FIG. 1, the belt driving part 3 is controlled so that the conveying belts 1A and 1B move to make the stopping members 6A and the stopping members 6B aligned in the width direction W. Thereby, the areas S between the adjoining stopping members 6A and 6A, and 6B and 6B become sheet bundle placement areas (FIG. 2). In this example, there are two placement areas S. Moreover, the guide driving part 4 is controlled so that the guide plates 21 and 22 become away from each other.

Figure 8:
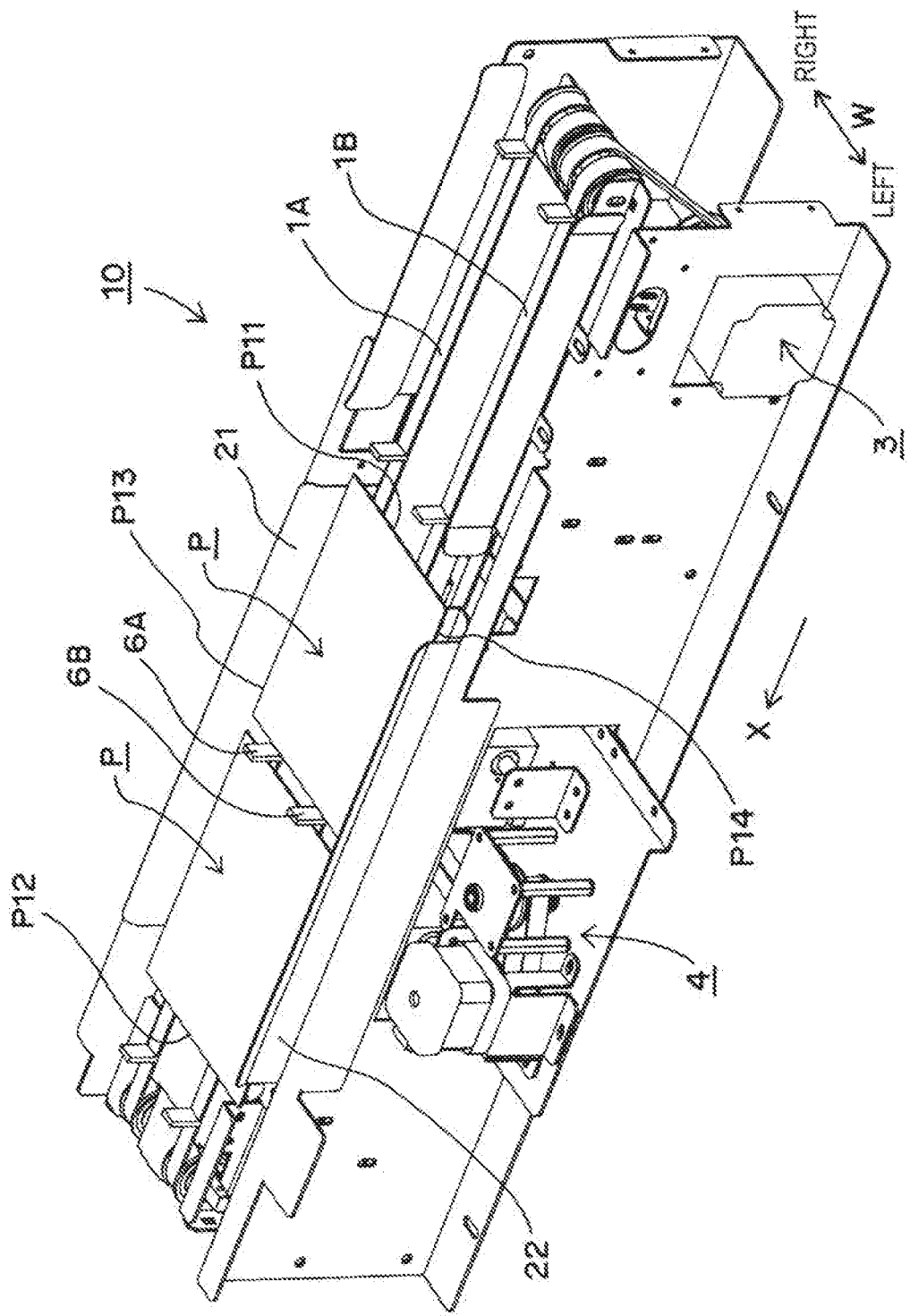
FIG. 8 is an upper perspective view showing the sheet bundle conveying apparatus in a state where sheet bundles are placed on placement areas.

(2) Next, when a sheet bundle P is placed on the placement areas S as shown in FIG. 8, the guide driving part 4 and the belt driving part 3 are controlled as follows:

(a) The guide driving part 4 is controlled so that the guide plates 21 and 22 sandwich the sheet bundle P from both sides in the width direction.

Figure 9:
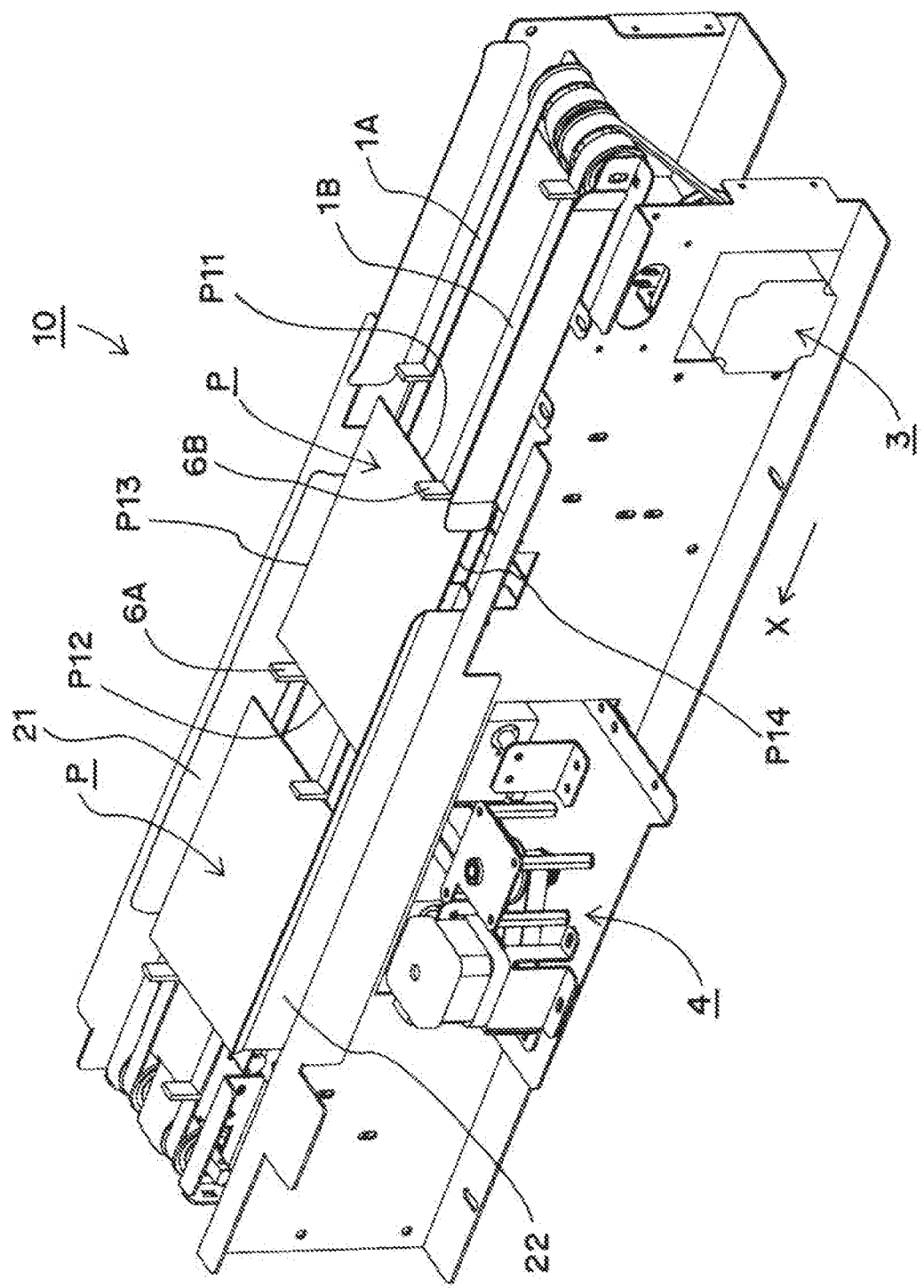
FIG. 9 is an upper perspective view showing the sheet bundle conveying apparatus in a state where the stopping members sandwich the sheet bundles placed on the placement areas from the front and the back.

(b) As shown in FIG. 9, the belt driving part 3 is controlled so that the conveying belt 1B is moved to make the stopping member 6B of the conveying belt 1B abut on the upstream side end surface (first end surface) P11 of the sheet bundle P and the sheet bundle P is conveyed under that condition to make the downstream side end surface (second end surface) P12 of the sheet bundle P abut on the stopping member 6A of the conveying belt 1A. Thereby, the sheet bundle P is sandwiched from the front and the back by the stopping member 6B and the stopping member 6A.

Either of the above (a) and the above (b) may be performed first, or they may be performed simultaneously. Moreover, in the above (b), the conveying belt 1A may be moved instead of the conveying belt 1B or both the conveying belts 1A and 1B may be moved as long as the sheet bundle P is brought into a state of being sandwiched from the front and the back by the stopping members 6A and the stopping members 6B.

(3) The belt driving part 3 and the guide driving part 4 are controlled so that the sheet bundle P is conveyed along the guide plates 21 and 22 in a state of being sandwiched from the front and the back by the stopping members 6B and the stopping members 6A like the above (2). The guide driving part 4 is controlled so that the guide plates 21 and 22 are not pressed against width direction both side end surfaces P13 and P14 of the sheet bundle P.

Operation

When a start button (not shown) of the apparatus 10 is depressed, the belt driving part 3 is actuated to move and stop the conveying belts 1A and 1B so that the stopping members 6A and the stopping members 6B are brought into a state of being aligned in the width direction. Moreover, the guide driving part 4 is actuated to make the guide plates 21 and 22 away from each other. Then, when the sheet bundle P is placed on the placement areas S as shown in FIG. 8, the guide driving part 4 and the belt driving part 3 are actuated. That is, the guide driving part 4 is actuated, so that the guide plates 21 and 22 sandwich the sheet bundle P from both sides in the width direction. Thereby, the sheet bundle P is aligned in the right-left direction. Moreover, simultaneously therewith, or before or after this, the belt driving part 3 is actuated, the conveying belt 1B is moved to make the stopping member 6B of the conveying belt 1B abut on the upstream side end surface P11 of the sheet bundle P and the sheet bundle P is conveyed under that condition to make the downstream side end surface P12 of the sheet bundle P abut on the stopping member 6A of the conveying belt 1A. Thereby, the sheet bundle P is sandwiched from the front and the back by the stopping member 6B and the stopping member 6A, so that it is aligned in the front-back direction. Then, the sheet bundle P is conveyed in a state of being sandwiched from the front and the back by the stopping member 6B and the stopping member 6A. Thereby, the sheet bundle P is prevented from collapsing at the time of conveyance, particularly, at the time of deceleration of conveyance.

Effects

With the sheet bundle conveying apparatus 10 of the above-described structure, the following effects are produced:

(1) The sheet bundle P placed on the placement areas S of the conveying belts 1A and 1B as shown in FIG. 8 can be aligned in the front-back direction by the stopping members 6A and 6B and can be aligned in the right-left direction by the guide plates and 22 as shown in FIG. 9. Consequently, the sheet bundle P can be aligned in the front-back and right-left directions.

(2) Since the sheet bundle P is conveyed in a state of being sandwiched from the front and the back by the stopping members 6A and 6B, the sheet bundle P can be prevented from collapsing at the time of deceleration of conveyance.

(3) Since the sheet bundle P is conveyed along the guide plates 21 and 22 in a state of being sandwiched from the front and the back by the stopping members 6A and 6B, the sheet bundle P can be conveyed in a state of being aligned in the conveyance direction and in the width direction.

Second Embodiment

Figure 10:
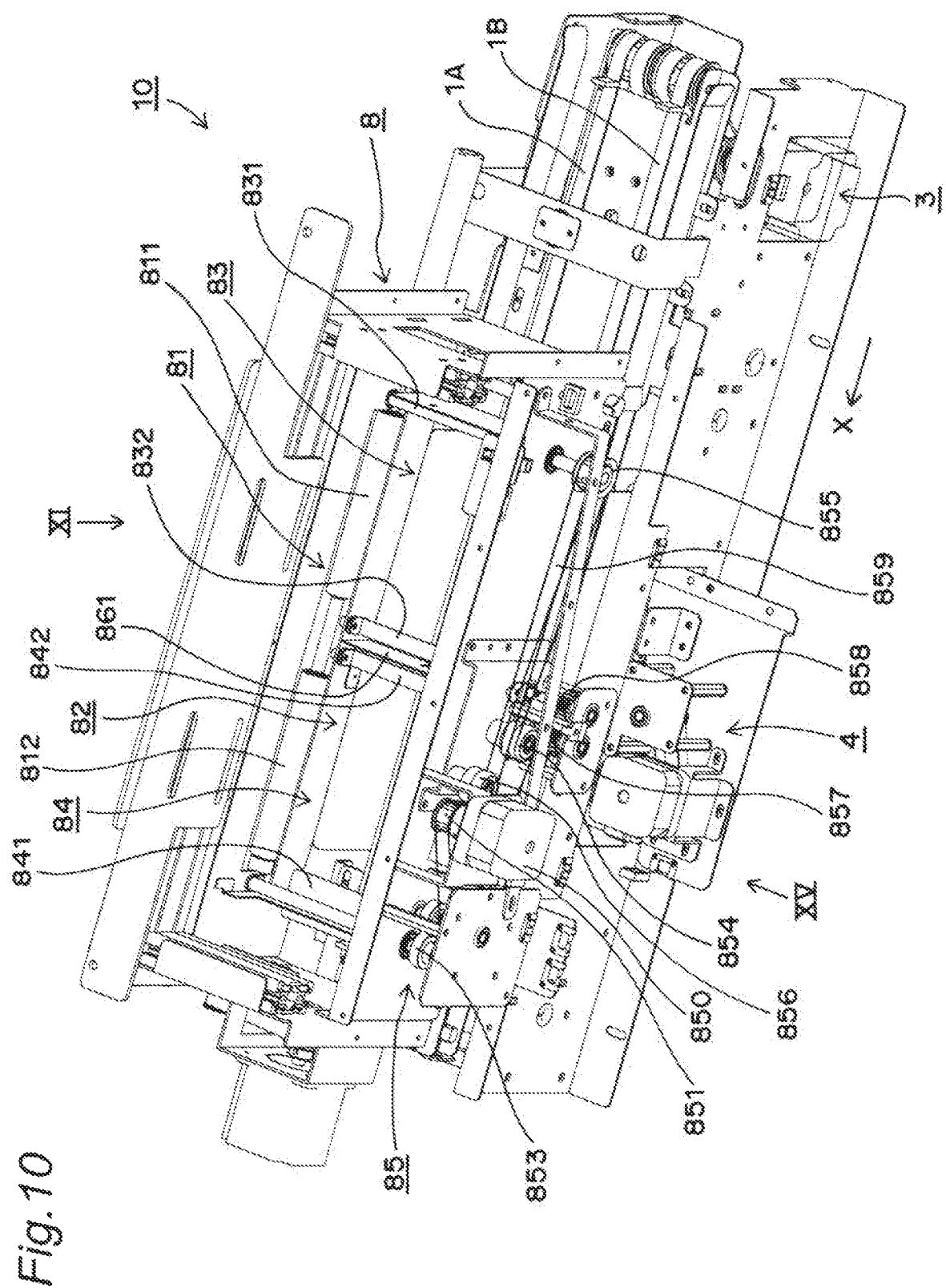
FIG. 10 is an upper perspective view of a sheet bundle conveying apparatus of a second embodiment of the present invention.
Figure 11:
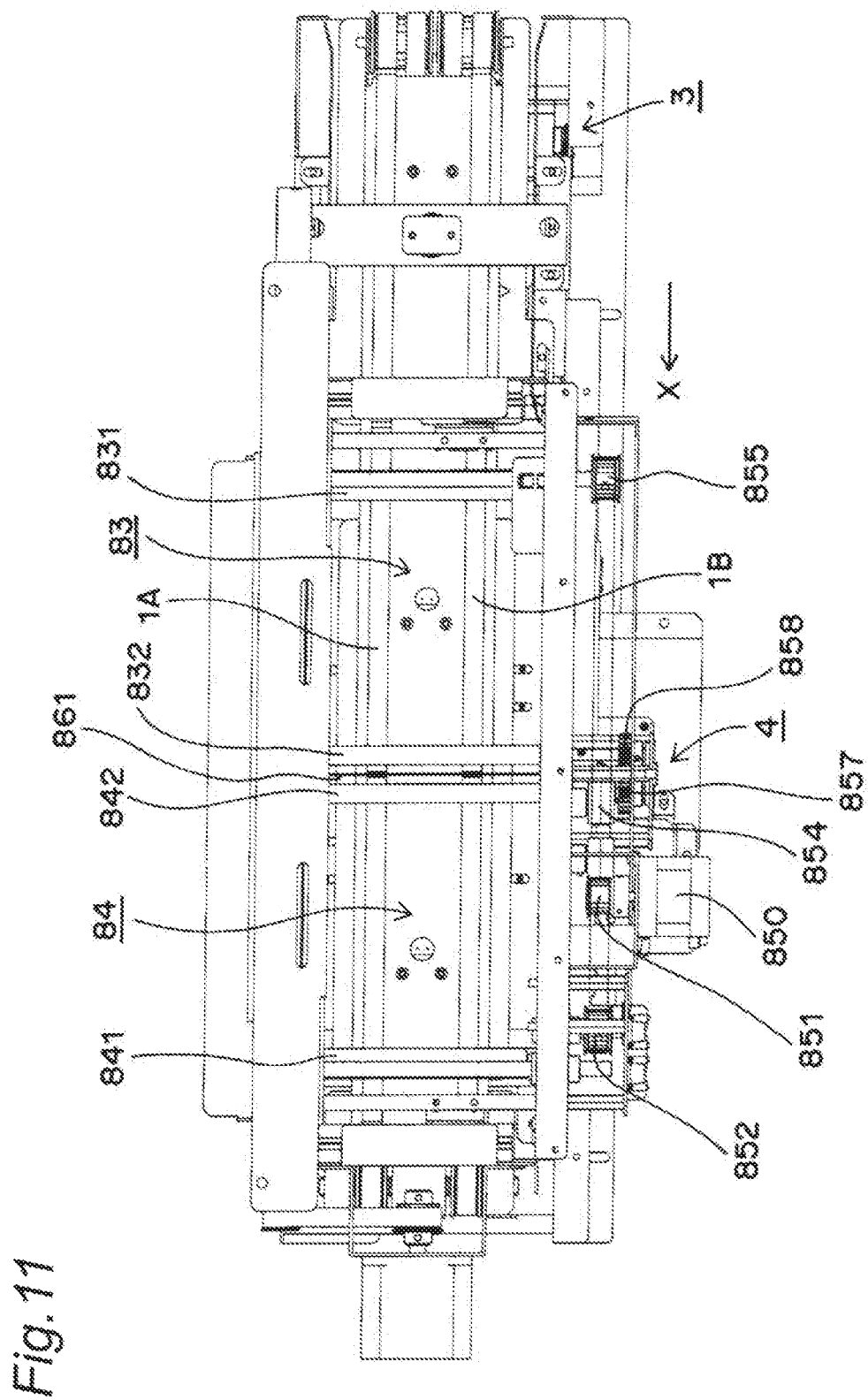
FIG. 11 is a view viewed in the direction of the arrow XI of FIG. 10 (plan view)

FIG. 10 is an upper perspective view of a sheet bundle conveying apparatus of an embodiment of the present invention. FIG. 11 is a view viewed in the direction of the arrow XI of FIG. 10 (plan view). This apparatus 10 is provided with a sheet storing part 8 above the conveying belts 1A and 1B, and except this, the structure is the same as that of the apparatus 10 of the first embodiment.

Sheet Storing Part

The sheet storing part 8 receives sheets from the preceding apparatus, store them until sheet bundles P are formed and place the sheet bundles P on the placement areas S of the conveying belts 1A and 1B at a time. The sheet storing part 8 has a convey-in part 81 conveying sheets from the preceding apparatus and a storage discharging part 82 that stores the conveyed-in sheets until sheet bundles P are formed and then, places them on the placement areas S at a time. The storage discharging part 82 has two storing parts 83 and 84 that store sheets, the two storing parts 83 and 84 correspond to two placement areas S, respectively, the storing part 83 is situated above the placement area S on the upstream side, and the storing part 84 is situated above the placement area S on the downstream side.

(1) Convey-in Part 81

Figure 12:
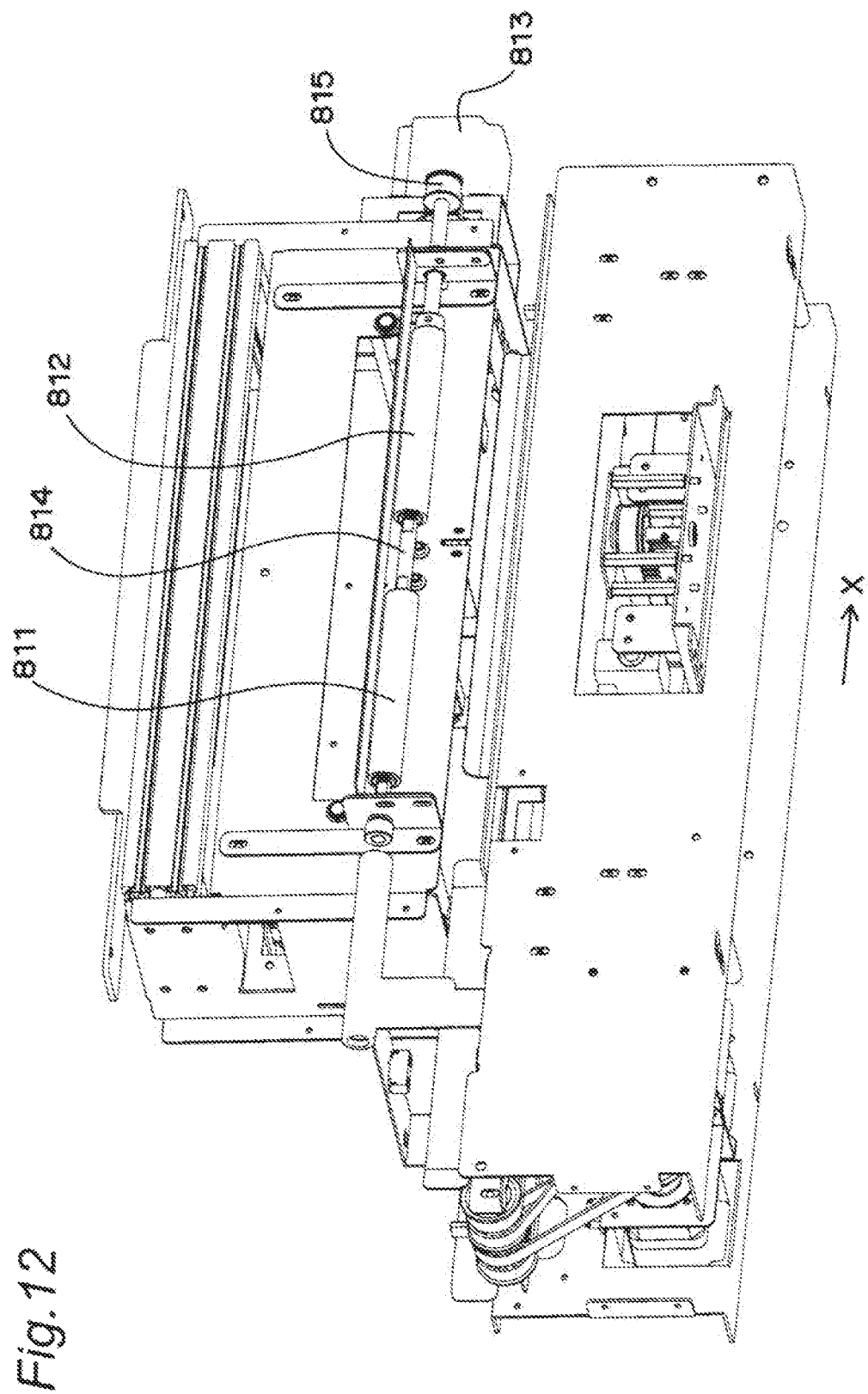
FIG. 12 is a perspective view of the right side of the sheet bundle conveying apparatus of FIG. 10 viewed from slightly below.

FIG. 12 is a perspective view of the right side of the apparatus 10 of FIG. 10 viewed from slightly below. The convey-in part 81 has a conveying roller 811 that conveys sheets into the storing part 83, a conveying roller 812 that conveys sheets into the storing part 84, and a motor 813 that drives the conveying rollers 811 and 812. The conveying rollers 811 and 812 are provided so as to be aligned on a horizontal rotation shaft 814. The motor 813 rotates the horizontal rotation shaft 814 through a belt 815.

(2) Storage Discharging Part 82

The storage discharging part 82 has the two storing parts 83 and 84 and a discharging mechanism 85 that discharges the sheet bundles P downward from the storing parts 83 and 84.

(2-1) Storing Parts 83 and 84

Figure 13:
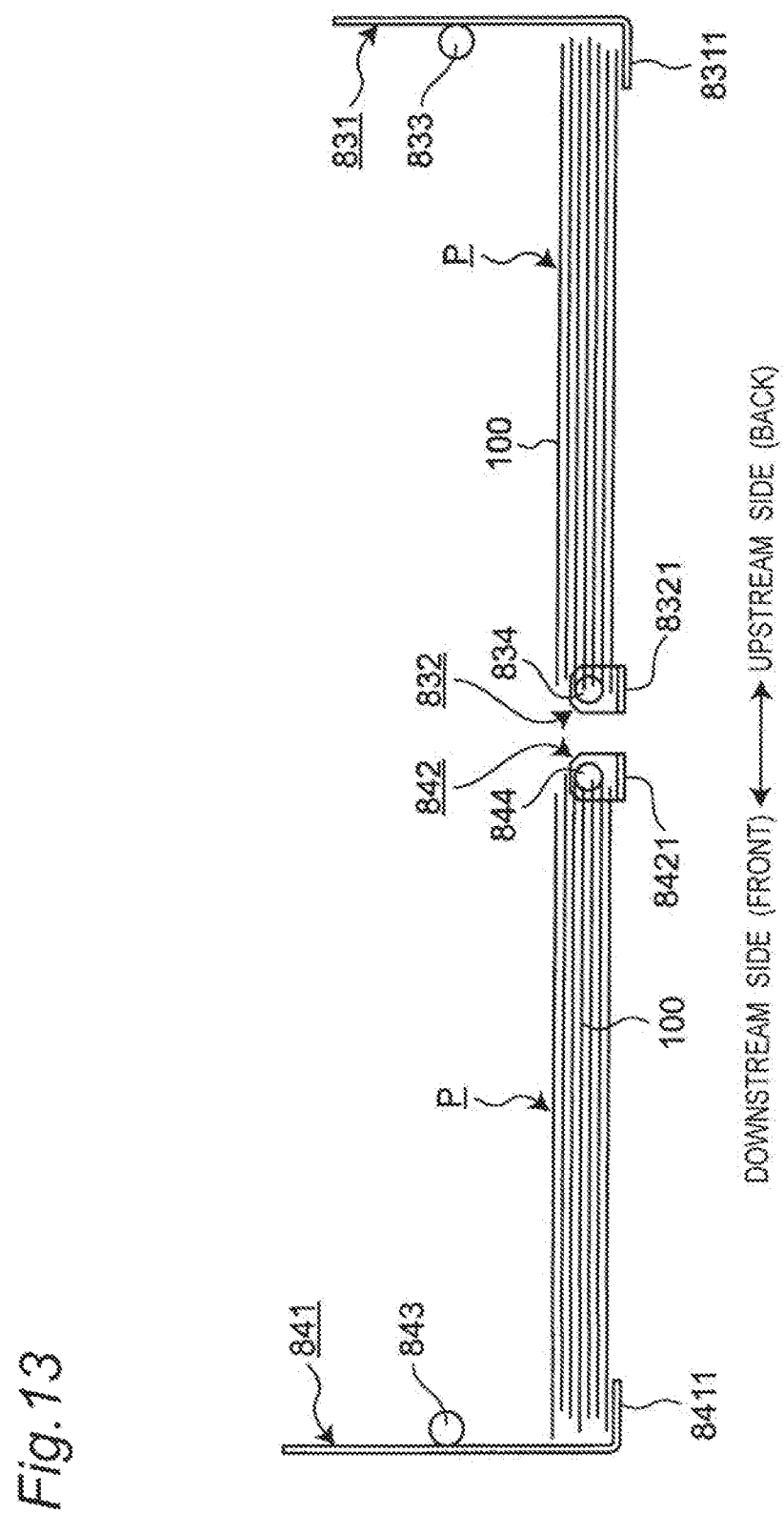
FIG. 13 is a cross-sectional view of storing parts in a state where sheets are stored.

The storing part 83 has two receiving frames 831 and 832. The storing part 84 also has two receiving frames 841 and 842. Between the storing part 83 and the storing part 84, a partition plate 861 is provided. FIG. 13 is a cross-sectional view of the storing parts 83 and 84 in a state where sheets 100 are stored. The storing part 83 receives the sheets 100 by receiving the upstream side ends of the sheets 100 with a horizontal receiving part 8311 of the receiving frame 831 and at the same time, receiving the downstream side end part of the sheets 100 with a horizontal receiving part 8321 of the receiving frame 832. The storing part 84 receives the sheets by receiving the downstream end part of the sheets with a horizontal receiving part 8411 of the receiving frame 841 and at the same time, receiving the upstream end part of the sheets with a horizontal receiving part 8421 of the receiving frame 842. The storing parts 83 and 84 continuously receive and store the sheets 100. It is desirable that the horizontal receiving part 8311 and the horizontal receiving part 8321 receive the sheets 100 in a state of being slightly inclined so as to be lowered toward the sheets 100, and the same applies to the horizontal receiving part 8411 and the horizontal receiving part 8421.

Figure 14:
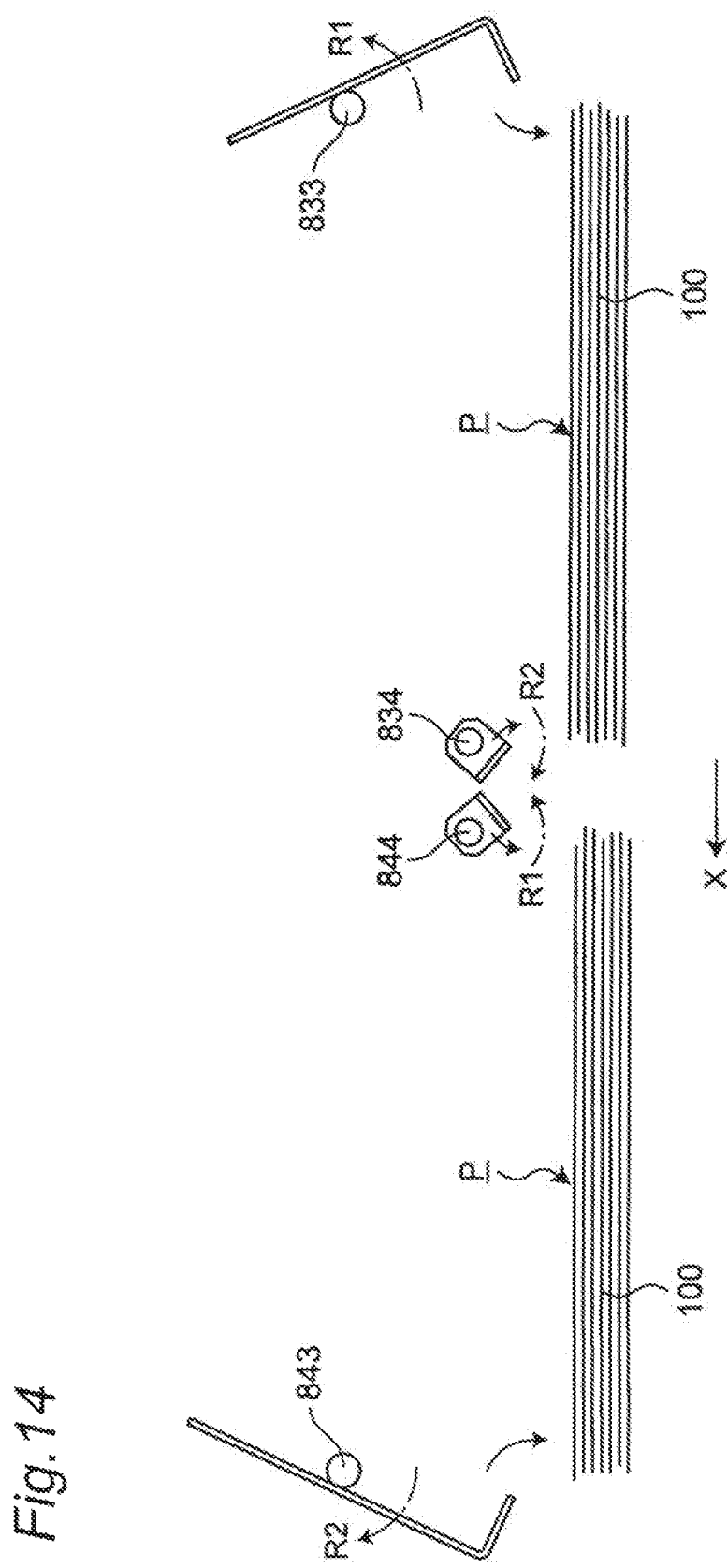
FIG. 14 is a cross-sectional view of the storing parts in a state where the sheet bundles are discharged.

FIG. 14 is a cross-sectional view of the storing parts 83 and 84 in a state where the sheet bundles P are discharged from the storing parts 83 and 84. In the storing part 83, the receiving frame 831 is rotatable in an R1 direction about a rotation shaft 833 so that the horizontal receiving part 8311 is largely inclined, and the receiving frame 832 is rotatable in an R2 direction about a rotation shaft 834 so that the horizontal receiving part 8321 is largely inclined. In the storing part 84, the receiving frame 841 is rotatable in the R2 direction about a rotation shaft 843 so that the horizontal receiving part 8411 is largely inclined, and the receiving frame 842 is rotatable in the R1 direction about a rotation shaft 844 so that the horizontal receiving part 8421 is largely inclined. The storing part 83 discharges the sheet bundle P downward by the receiving frame 831 rotating in the R1 direction and the receiving frame 832 rotating in the R2 direction. The storing part 84 discharges the sheet bundle P downward by the receiving frame 841 rotating in the R2 direction and the receiving frame 842 rotating in the R1 direction.

(2-2) Discharging Mechanism 85

Figure 15:
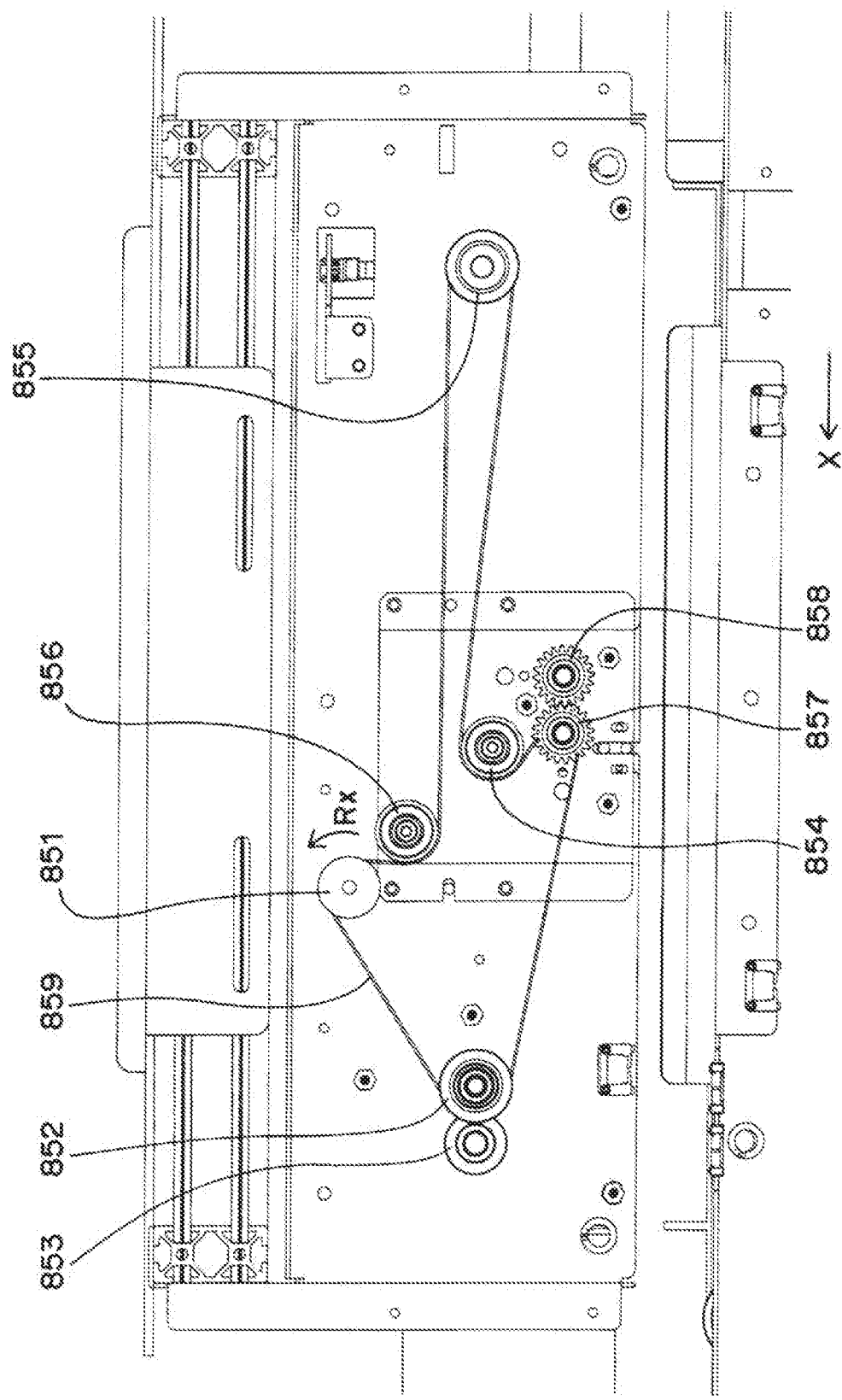
FIG. 15 is a view of the sheet storing parts of the sheet handle conveying apparatus viewed in the direction of the arrow XV of FIG. 10.

FIG. 15 is a view of the sheet storing part 8 of the apparatus 10 viewed in the direction of the arrow XV of FIG. 10. The discharging mechanism 85 has: a motor 850 that rotates the rotation shafts 833, 834, 843 and 844 (FIGS. 13 and 14); rollers 851, 852, 853, 854, 855 and 856 that transmit the rotation of the motor 850 to the rotation shafts 833, 834, 843 and 844; gears 857 and 858; and a transmission belt 859. The roller 851 is fixed to the rotation shaft of the motor 850. The roller 853 is fixed to the rotation shaft 843, and rotates reversely to the roller 852 in accordance with the rotation or the roller 852. The roller 855 is fixed to the rotation shaft 833. The gear 857 is fixed to the rotation shaft 844. The gear 858 is fixed to the rotation shaft 834. The gear 858 meshes with the gear 857, and rotates reversely to the gear 857. The transmission belt 859 is wound around the rollers 851 and 852, the gear 857 and the rollers 854, 855 and 856 so that when the motor 850 is driven in an Rx direction, the roller 853, that is, the rotation shaft 843 rotates in the R2 direction, the gear 857, that is, the rotation shaft 844 rotates in the R1 direction and the roller 855, that is, the rotation shaft 833 rotates in the R1 direction and when the motor 850 is driven in a reverse Rx direction, these rotate in the reverse directions. Therefore, the discharging mechanism 85 causes the storing part 83 to execute the discharging operation by driving the motor 850 in the Rx direction to thereby rotate the receiving frame 831 of the storing part 83 in the R1 direction and rotate the receiving frame 832 in the R2 direction, causes the storing part 84 to execute the discharging operation by rotating the receiving frame 841 of the storing part 84 in the R2 direction and rotating the receiving frame 842 in the R1 direction, and returns the receiving frames 831 and 832 of the storing part 83 to storing state and return the receiving frames 841 and 842 of the storing part 84 to storing state by driving the motor 850 in the reverse Rx direction.

Operation

Figure 16:
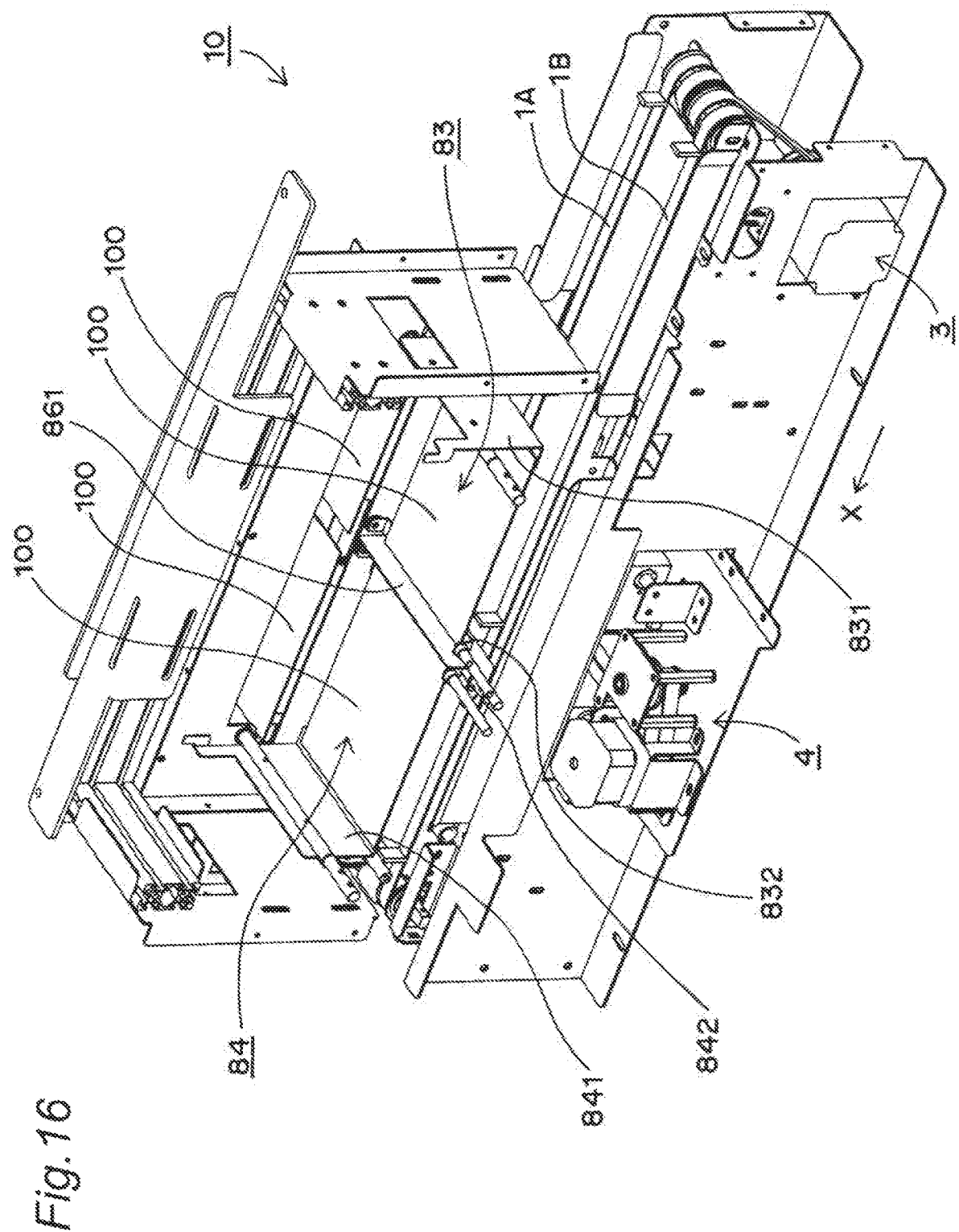
FIG. 16 is an upper perspective view of the sheet bundle conveying apparatus in a state where the sheets are conveyed into the storing parts.

When the start button (not shown) of the apparatus 10 is depressed, the convey-in part 81 is actuated, and as shown in FIG. 16, the sheets 100 are conveyed into the storing part 83 by the conveying roller 811 and the sheets 100 are conveyed into the storing part 84 by the conveying roller 812. The conveyed-in sheets are, as shown in FIGS. 13 and 16, received by the receiving frames 831 and 832 at the storing part 83 and received by the receiving frames 841 and 842 at the storing part 84. Then, the sheets 100 are continuously conveyed in, so that the sheet bundles P are formed at the storing parts 83 and 84.

When the sheet bundles P are formed, the discharging mechanism 85 is actuated, and as shown in FIG. 14, the storing parts 83 and 84 execute the discharging operation. Thereby, the sheet bundles P fall onto the two placement areas S. That is, the sheet bundles P are placed on the placement areas S. Thereafter, by an operation similar to that of the first embodiment, the sheet bundles P are aligned in the front-back direction and in the right-left direction and are conveyed in a state of being sandwiched from the front and the back between the stopping members 6B and the stopping members 6A.

Further, when the sheets 100 are conveyed in the storing parts 83 and 84 and the sheet bundles P are formed, similarly to the above, the sheet bundles P are placed on the placement area S and are conveyed. Then, this is repeated. At this time, the driving control part (not shown) controls the belt driving part 3 and the guide driving part 4 so that the sheet bundles P are conveyed by the conveying belts 1A and 1B while the storing parts 83 and 84 are receiving the sheets 100. Consequently, when the conveyance of the sheet bundles P is finished, the sheet bundles P are immediately placed on the placement areas S.

Effects

With the sheet bundle conveying apparatus 10 of the above-described structure, the following effects are produced:

(1) Since the sheet storing part 8 is provided, the sheet bundles P can be automatically placed on the placement areas S at a time. Consequently, workability can be improved.

(2) Further, since the sheet bundles P are conveyed by the conveying belts 1A and 1B while the storing parts 83 and 84 are receiving the sheets 100, when the conveyance of the sheet bundles P is finished, the sheet bundles P can be immediately placed on the placement areas S. Consequently, workability can be further improved.

Figure 17:
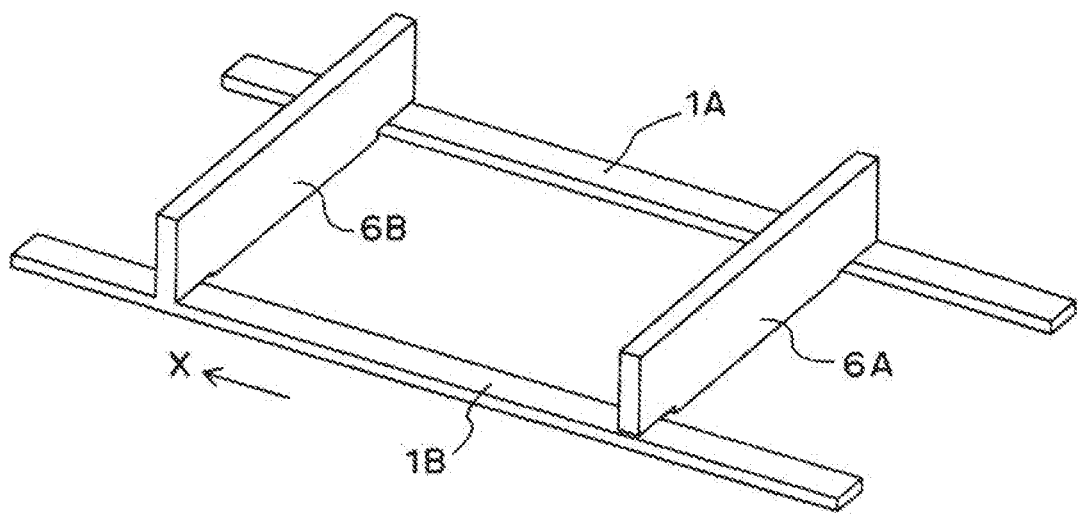
FIG. 17 is an upper perspective view showing a first other example of the stopping members.
Figure 19:
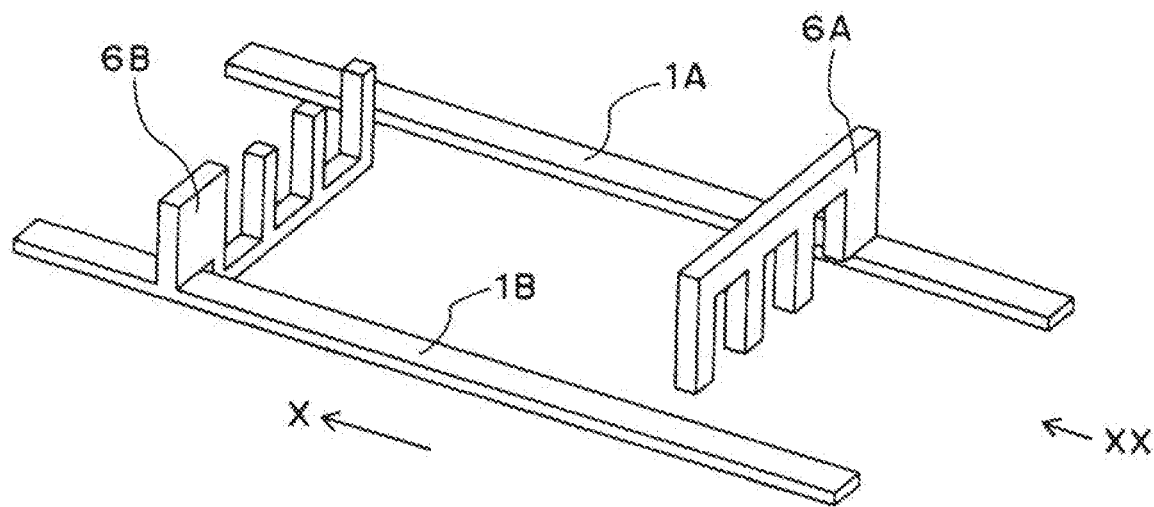
FIG. 19 is an upper perspective view showing a second other example of the stepping members.

Modified Structures (a) As shown in FIG. 17 or 19, the stopping members 6A and 6B may have a form largely protruding from the conveying belts 1A and 1B.

Figure 18:
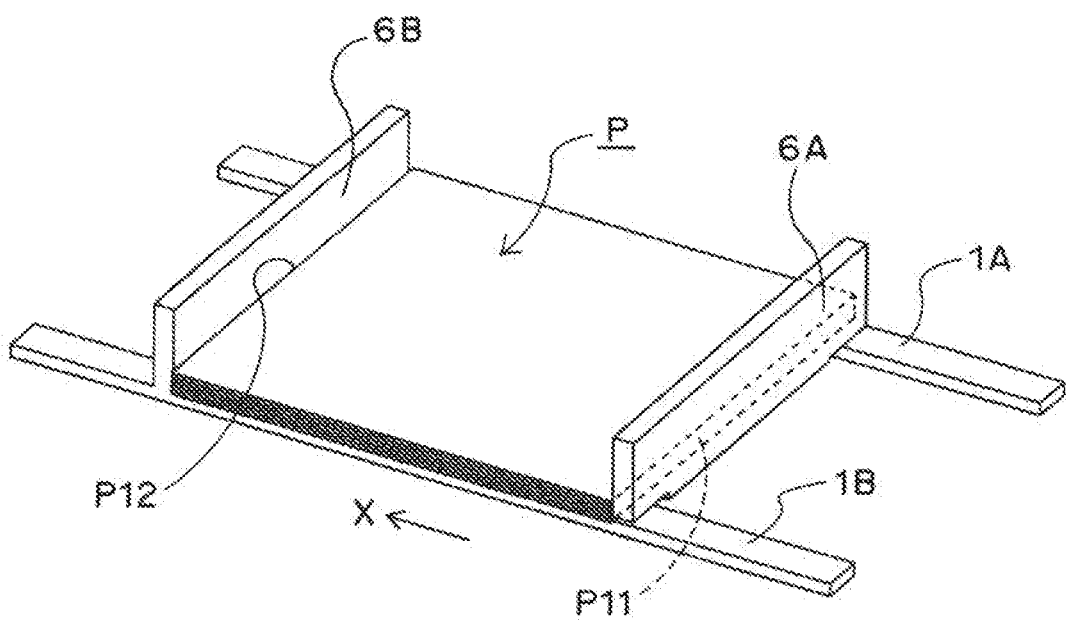
FIG. 18 is an upper perspective view showing a state where the sheet bundle is sandwiched from the front and the back by the stopping members of FIG. 17.

(a-1) In FIG. 17, the stopping member 6A has a plate-like form laterally extending from the conveying belt 1A onto the conveying belt 1B, and the stopping member 6B has a plate-like form laterally extending from the conveying belt 1B onto the conveying belt 1A. When viewed from the upstream side or the downstream side, the stopping member 6A and the stopping member 6B substantially wholly overlap with each other, that is, overlap with each other at the dimension in the width direction. With this, as shown in FIG. 18, the stopping member 6A abuts on substantially the whole of the end surface P11 of the sheet bundle P and the stopping member 6B abuts on substantially the whole of the end surface P12 of the sheet bundle P, so that the sheet bundle P sandwiched from the front and the back by the stopping members 6A and 6B is more stabilized in the front-back direction.

Figure 20:
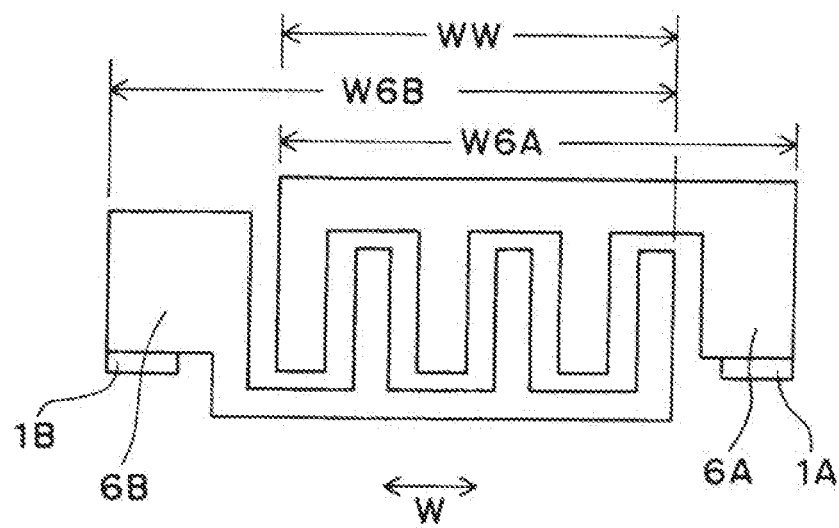
FIG. 20 is a view viewed in the direction of the arrow XX of FIG. 19.

(a-2) In FIG. 19, the stopping member 6A laterally extends from the conveying belt 1A to a front of the conveying belt 1B and has a downward-facing comb-like form capable of abutting on an end surface of the sheet bundle P, and the stopping member 6B laterally extends from the conveying belt 1B to a front of the conveying belt 1A and has an upward-facing comb-like form capable of abutting on an end surface of the sheet bundle P. When viewed from the upstream side or the downstream side, as shown in FIG. 20, the stopping member 6A and the stopping member 6B overlap with each other in a range WW at dimensions W6A and W6B in the width direction and do not interfere with each other even if they are aligned in the width direction. With this, the stopping members 6A and 6B also abut on wide areas of the end surfaces P11 and P12 of the sheet bundle P, the sheet bundle P sandwiched from the front and the back by the stopping members 6A and 6B is more stabilized in the front-back direction.

Figure 21:
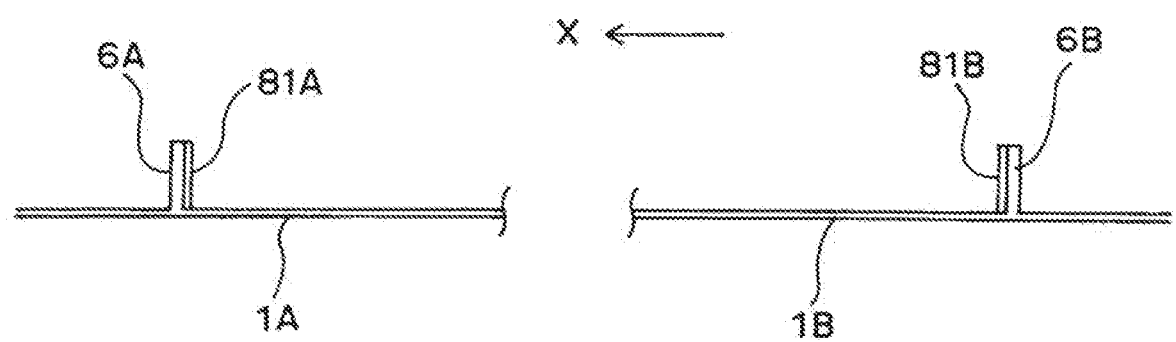
FIG. 21 is a partial side view showing a third other example of the stopping members.

(b) It is desirable that the stopping members 6A and 6B have elasticity on the abutting surfaces where they abut on the end surfaces P11 and P12 of the sheet bundle P. Specifically, in the case of the above-described embodiment, as shown in FIG. 21, an elastic member 81A is provided on the upstream side abutting surface of the stopping member 6A, and an elastic member 81B is provided on the downstream side abutting surface of the stepping member 6B. With this, when the sheet bundle P is sandwiched from the front and the back by the stopping members 6A and 6B, the sheets are prevented from being excessively sandwiched to be bent or damaged. It is desirable that the stopping members 6A and 6B have elasticity on the abutting surfaces on both sides.

(c) The number of conveying belts 1 is not limited to two but may be three or more.

(d) The number of placement areas S may be one or may be three or more. The larger the number of placement areas S is, the more excellent workability is.

(e) In (1) of the driving control part, it is not necessary for the stopping members 6A and 6B to be aligned in the width direction as long as a placement area S where the sheet bundle P can be placed is secured.

Figure 22:
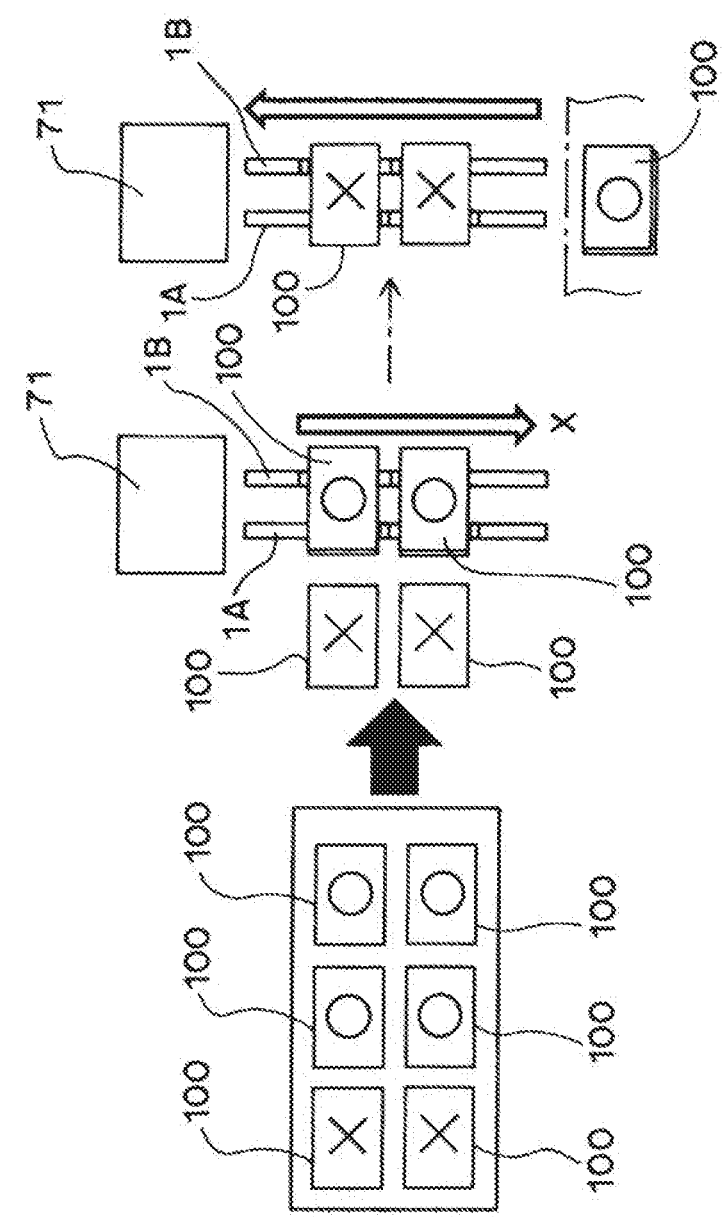
FIG. 22 is a substantial plan view of a first modification of the second embodiment of the present invention.
Figure 23:
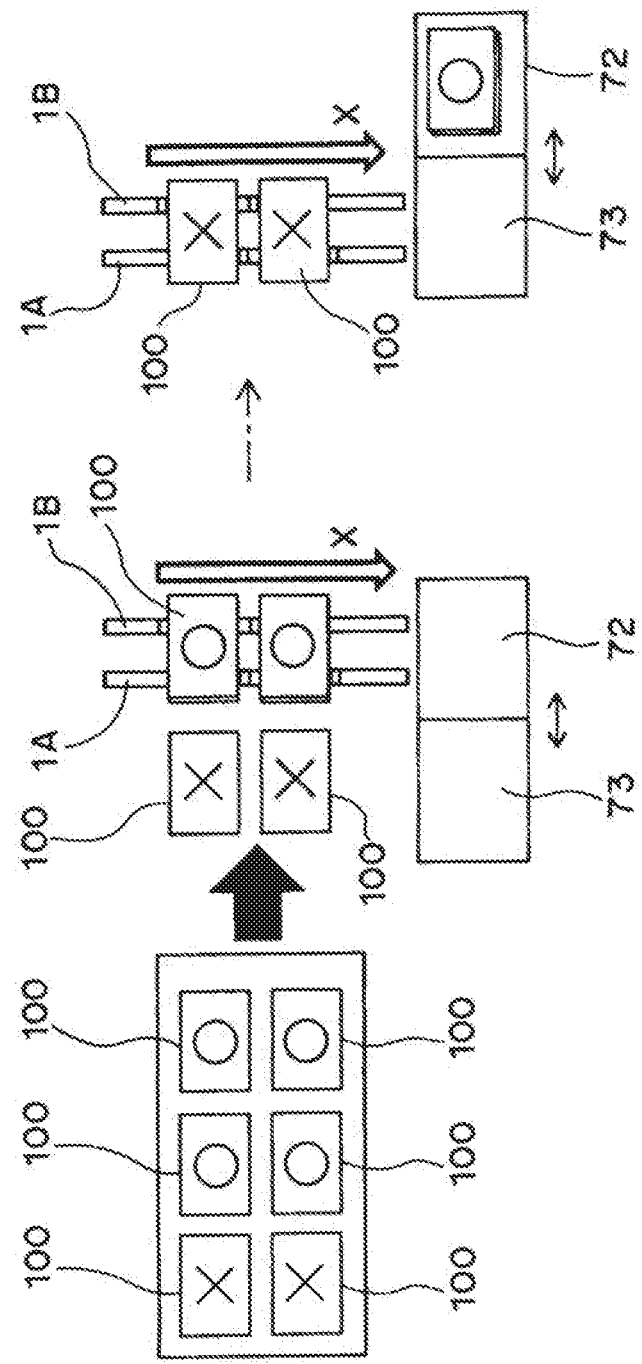
FIG. 23 is a substantial plan view of a second modification of the second embodiment of the present invention.

(f) In the second embodiment, in a case where one large sheet is out so that a multiplicity of sheets are conveyed to the sheet storing part 8, although it is not a problem if all the sheets are necessary for the apparatus succeeding the sheet bundle conveying apparatus, when an unnecessary sheet is included, it is desirable to exclude the unnecessary sheet. To do so, the following structure (f-1) or (f-2) may be adopted. In FIGS. 22 and 23, "o" indicates necessary sheets 100, whereas "X" indicates unnecessary sheets 100.

(f-1) As shown in FIG. 22, at the upstream end of the conveying belts 1A and 1B, an unnecessary sheet receiving part 71 is provided. The driving control part controls the belt driving part 3 so that the conveying belts 1A and 1B move in a direction opposite to the conveyance direction X when an unnecessary sheet or sheet bundle is placed on the conveying belts 1A and 1B. The unnecessary sheet receiving part 71 receives the sheet or the sheet bundle conveyed to the upstream side.

(f-2) As shown in FIG. 23, at the lower end of the conveying belt 1A and 1B, a necessary sheet receiving part 72 and an unnecessary sheet receiving part 73 are provided so as to be switchable by a receiving part switching mechanism (not shown). The driving control part controls the receiving part switching mechanism so that when an unnecessary sheet or sheet bundle is placed on the conveying belts 1A and 1B, switching is made from the necessary sheet receiving part 72 to the unnecessary sheet receiving part 73. The necessary sheet receiving part 72 receives the necessary sheet bundle conveyed to the downstream side, and the unnecessary sheet receiving part 73 receives an unnecessary sheet or sheet bundle conveyed to the downstream side.

(g) A structure may be adopted that is provided with only one of the guide plates 21 and 22, and in this structure, the entire apparatus 10 or at least the conveying belts 1 is inclined so that the guide plate side is lower in the width direction. With this, a side end surface of the sheet bundle P can be set along one guide plate, and consequently, the alignment of the sheet bundle P in the right-left direction can be made only with one guide plate.

(h) The number of stopping members may be one for one conveying belt.

Figure 24:
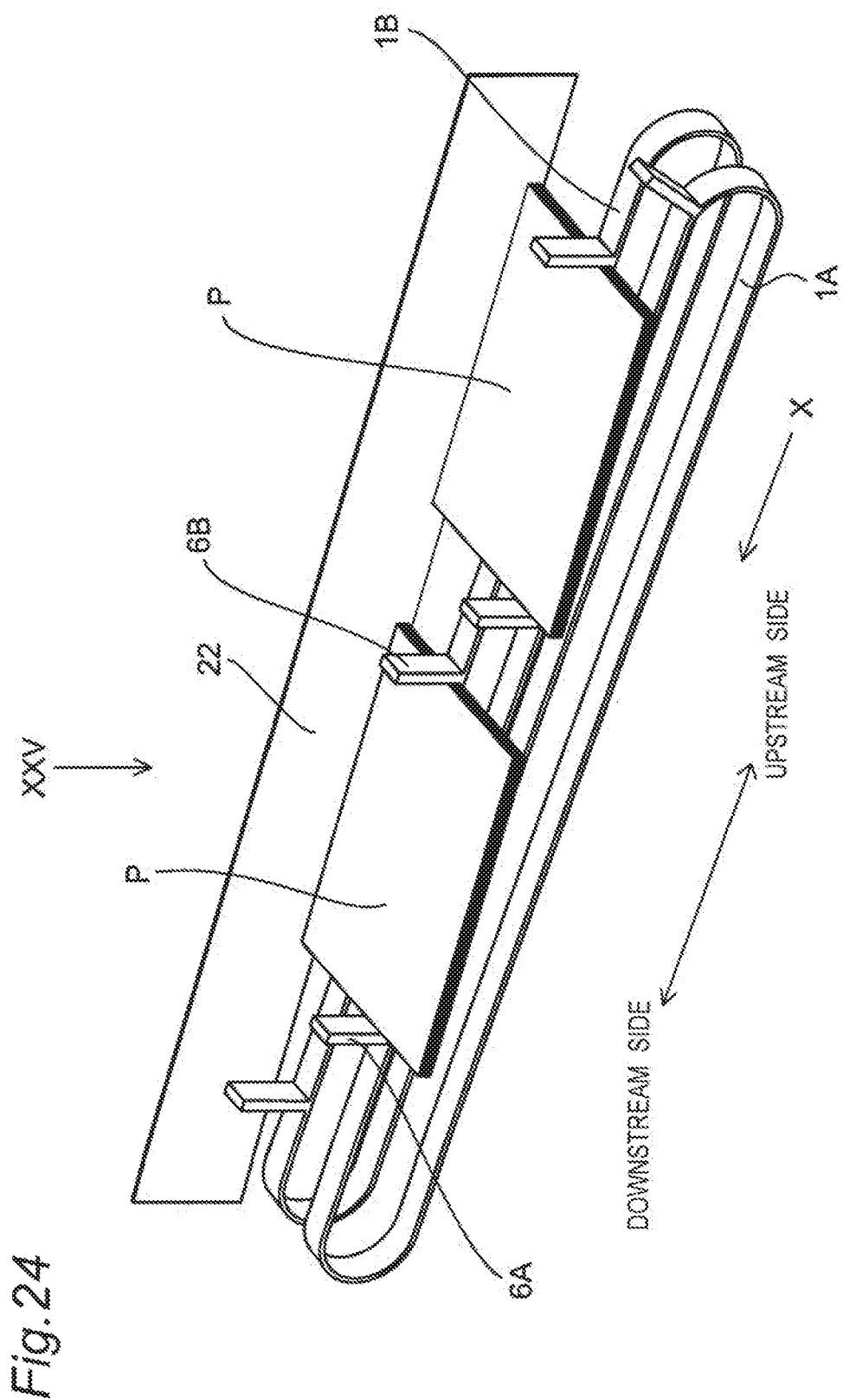
FIG. 24 is a perspective view of a modification of the conveying belts.

(i) As shown in FIG. 24 which is a perspective view and FIG. 25 which is a view viewed in the direction of the arrow XXV of FIG. 24, the conveying belts may be inclined with respect to the conveyance direction X so that the sheet bundle P is forcibly set along one guide plate 22. With this, the alignment of the sheet bundle P in the right-left direction can be made only with one guide plate.

(j) While the sheets are conveyed in in a direction orthogonal to the conveyance direction in the above-described embodiment, the sheets may be conveyed in from the upstream side in the conveyance direction.

(k) In the operation of the guide driving part 4, when "the guide plates 21 and 22 sandwich the sheet bundle P from both sides in the width direction", a slight gap may be present between the guide plates 21 and 22 and both the right and left end surfaces of the sheet bundle P. And/or in the operation of the belt driving part 3, when "the downstream side end surface (second end surface) P12 of the sheet bundle P is made to abut on the stopping member 6A of the conveying belt 1A", a slight gap may be present between the stopping member 6A and the downstream side end surface (second end surface) P12 of the sheet bundle P.

This is done by the driving control part controlling the guide driving part 4 and/or the belt driving part 3 so that the "slight gap" is present.

Here, the "slight gap" is set based on the variations in size among the sheets 100, the positional accuracy of the guide plates 21 and 22 and/or the positional accuracy of the stopping members 6A and 6B, and "play". Specifically, when the size of the sheets 100 is A4, the gap is approximately 0.5 mm.

Moreover, information related to the "slight gap" may be prestored in the driving control part, may be inputted later to the driving control part, or may be obtained by the driving control part based on information from the preceding apparatus.

The presence of the "slight gap" produces the following effects:

Even if there are variations in size among the sheets, the obverse and reverse surfaces and end surfaces of the sheets can be prevented from being damaged.

Even when a sheet processing apparatus is present on the preceding stage and there are variations in the processing accuracy thereof, the variations can be absorbed so that the sheet bundle is aligned in the right-left direction and/or in the front-back direction.

(1) The present invention may include a case where the regulating guide 2 and the guide driving part 4 are not provided. In that case, the driving control part controls only the belt driving part 3 similarly to the above-described embodiment. In this case, the above (k) may also be adopted.

INDUSTRIAL APPLICABILITY

The sheet handle conveying apparatus of the present invention is high in industrial utility value since the sheet bundle can be prevented from collapsing at the time of deceleration when the sheet bundle is conveyed and this makes it possible to smoothly perform the processing on the sheet bundle thereafter.

DESCRIPTION OF REFERENCE NUMERALS

1, 1A, 1B Conveying belt
10 Sheet bundle conveying apparatus
100 Sheet
2 Regulating guide
21, 22 Guide plate
3 Belt driving part
4 Guide driving part
6A, 6B Stopping member
71, 73 Unnecessary sheet receiving part
72 Necessary sheet receiving part
8 Sheet storing part
P Sheet bundle
P11 Upstream side end surface (first end surface)
P12 Downstream side end surface (second end surface)
S Placement area

The invention claimed is:

1. A sheet bundle conveying apparatus that conveys a sheet bundle formed of a predetermined number of sheets, the apparatus comprising:
   a plurality of conveying belts juxtaposed so that the sheet bundle is conveyed while being placed thereon;
   a regulating guide that is movable so as to sandwich the sheet bundle placed on the conveying belts from both sides in a direction orthogonal to a conveyance direction;
   a belt driving part that drives the conveying belts;
   a guide driving part that drives the regulating guide; and
   a driving control part that controls the belt driving part and the guide driving part,
   wherein the conveying belts have stopping members having a form abuttable on a first end surface on an upstream side and/or a second end surface on a downstream side in the conveyance direction of the sheet bundle being placed, and have a placement area for the sheet bundle on the upstream side and/or the downstream side of the stopping members, and
   (I) when the sheet bundle is placed on the placement area, the driving control part controls the belt driving part so that the conveying belts move so as to bring the stopping members to predetermined positions, respectively,
   (II) after the sheet bundle is placed on the placement area, the driving control part (a) controls the guide driving part so that the regulating guide sandwiches the sheet bundle from both sides in the orthogonal direction and (b) controls the belt driving part so that at least one of the conveying belts is moved to make the stopping members of the conveying belt abut on the first end surface or the second end surface of the sheet bundle and at the same time or thereafter, make the second end surface or the first end surface of the sheet bundle abut on the stopping member of the other of the conveying belts, and
   (III) the driving control part controls the belt driving part and the guide driving part so that the sheet bundle is conveyed along the regulating guide with the stopping members abutting on the first end surface and the second end surface as in the above (II),
   wherein the stopping members have elasticity on abutting surfaces abutting on the first end surface and/or the second end surface of the sheet bundle.

2. The sheet bundle conveying apparatus according to claim 1,
   wherein in the above (a) of the above (II), when the sheet bundle is sandwiched, a gap is present between the regulating guide and both side end surfaces in the orthogonal direction of the sheet bundle, and/or
   in the above (b) of the above (II), when the second end surface or the first end surface of the sheet bundle is made to abut on the stopping member of the other of the conveying belts, a gap is present therebetween.

3. The sheet bundle conveying apparatus according to claim 1,
   wherein in the above (I), the driving control part controls the belt driving part so that all the stopping members of all the conveying belts are aligned in the orthogonal direction.

4. The sheet bundle conveying apparatus according to claim 1, wherein the stopping members have a wide form so that the stopping member abutting on the first end surface of the sheet bundle and the stopping member abutting on the second end surface thereof partially overlap with each other at a dimension in the orthogonal direction when viewed from the upstream side or the downstream side in the conveyance direction.

5. The sheet bundle conveying apparatus according to claim 1,
wherein the conveying belts have a plurality of placement areas.

6. A sheet bundle conveying apparatus that conveys a sheet bundle formed of a predetermined number of sheets, the apparatus comprising:
a plurality of conveying belts juxtaposed so that the sheet bundle is conveyed while being placed thereon;
a regulating guide that is movable so as to sandwich the sheet bundle placed on the conveying belts from both sides in a direction orthogonal to a conveyance direction;
a belt driving part that drives the conveying belts;
a guide driving part that drives the regulating guide;
a driving control part that controls the belt driving part and the guide driving part,
wherein the conveying belts have stopping members having a form abuttable on a first end surface on an upstream side and/or a second end surface on a downstream side in the conveyance direction of the sheet bundle being placed, and have a placement area for the sheet bundle on the upstream side and/or the downstream side of the stopping members, and
(I) when the sheet bundle is placed on the placement area, the driving control part controls the belt driving part so that the conveying belts move so as to bring the stopping members to predetermined positions, respectively,
(II) after the sheet bundle is placed on the placement area, the driving control part (a) controls the guide driving part so that the regulating guide sandwiches the sheet bundle from both sides in the orthogonal direction and (b) controls the belt driving part so that at least one of the conveying belts is moved to make the stopping members of the conveying belt abut on the first end surface or the second end surface of the sheet bundle and at the same time or thereafter, make the second end surface or the first end surface of the sheet bundle abut on the stopping member of the other of the conveying belts, and
(III) the driving control part controls the belt driving part and the guide driving part so that the sheet bundle is conveyed along the regulating guide with the stopping members abutting on the first end surface and the second end surface as in the above (II); and
a sheet storing part that receives the sheets from a preceding apparatus and stores them until the sheet bundles are formed,
wherein the sheet storing part places the sheet bundles on the placement areas at a time.

7. The sheet bundle conveying apparatus according to claim 6,
wherein the driving control part controls the belt driving part and the guide driving part so that the sheet bundle is conveyed while the sheet storing part is receiving the sheets.

8. The sheet bundle conveying apparatus according to claim 6, further comprising an unnecessary sheet receiving part that receives, when the sheets or the sheet bundle placed on the conveying belts are unnecessary for a succeeding apparatus, the sheets or the sheet bundle being conveyed,
wherein the unnecessary sheet receiving part is
(A) provided at an upstream end of the conveying belts, or
(B) provided at a downstream end of the conveying belts together with a necessary sheet receiving part that receives the sheet bundle necessary for the succeeding apparatus and provided so as to be switchable with the necessary sheet receiving part by a receiving part switching mechanism, and
in a case where the sheets or the sheet bundle that is unnecessary is placed on the conveying belts,
(X) in a case of the above (A), the driving control part controls the belt driving part so that the conveying belts move in a direction opposite to the conveyance direction, or
(Y) in a case of the above (B), the driving control part controls the receiving part switching part so that switching is made from the necessary sheet receiving part to the unnecessary sheet receiving part.

9. The sheet bundle conveying apparatus according to claim 6,
wherein in the above (a) of the above (II), when the sheet bundle is sandwiched, a gap is present between the regulating guide and both side end surfaces in the orthogonal direction of the sheet bundle, and/or
in the above (b) of the above (II), when the second end surface or the first end surface of the sheet bundle is made to abut on the stopping member of the other of the conveying belts, a gap is present therebetween.

10. The sheet bundle conveying apparatus according to claim 6,
wherein in the above (I), the driving control part controls the belt driving part so that all the stopping members of all the conveying belts are aligned in the orthogonal direction.

11. The sheet bundle conveying apparatus according to claim 6,
wherein the stopping members have a wide form so that the stopping member abutting on the first end surface of the sheet bundle and the stopping member abutting on the second end surface thereof partially overlap with each other at a dimension in the orthogonal direction when viewed from the upstream side or the downstream side in the conveyance direction.

12. The sheet bundle conveying apparatus according to claim 6,
wherein the conveying belts have a plurality of placement areas.

13. A sheet bundle conveying apparatus that conveys a sheet bundle formed of a predetermined number of sheets, the apparatus comprising:
a plurality of conveying belts juxtaposed so that the sheet bundle is conveyed while being placed thereon;
a regulating guide that is movable so as to sandwich the sheet bundle placed on the conveying belts from both sides in a direction orthogonal to a conveyance direction;
a belt driving part that drives the conveying belts;
a guide driving part that drives the regulating guide;
a driving control part that controls the belt driving part and the guide driving part,
wherein the conveying belts have stopping members having a form abuttable on a first end surface on an upstream side and/or a second end surface on a downstream side in the conveyance direction of the sheet bundle being placed, and have a placement area for the sheet bundle on the upstream side and/or the downstream side of the stopping members, and (I) when the sheet bundle is placed on the placement area, the driving control part controls the belt driving part so that the conveying belts move so as to bring the stopping members to predetermined positions, respectively, (II) after the sheet bundle is placed on the placement area, the driving control part (a) controls the guide driving part so that the regulating guide sandwiches the sheet bundle from both sides in the orthogonal direction and (b) controls the belt driving part so that at least one of the conveying belts is moved to make the stopping members of the conveying belt abut on the first end surface or the second end surface of the sheet bundle and at the same time or thereafter, make the second end surface or the first end surface of the sheet bundle abut on the stopping member of the other of the conveying belts, and (III) the driving control part controls the belt driving part and the guide driving part so that the sheet bundle is conveyed along the regulating guide with the stopping members abutting on the first end surface and the second end surface as in the above (II); and an unnecessary sheet receiving part that receives, when the sheets or the sheet bundle placed on the conveying belts are unnecessary for a succeeding apparatus, the sheets or the sheet bundle being conveyed, wherein the unnecessary sheet receiving part is (A) provided at an upstream end of the conveying belts, or (B) provided at a downstream end of the conveying belts together with a necessary sheet receiving part that receives the sheet bundle necessary for the succeeding apparatus and provided so as to be switchable with the necessary sheet receiving part by a receiving part switching mechanism, and in a case where the sheets or the sheet bundle that is unnecessary is placed on the conveying belts, (X) in a case of the above (A), the driving control part controls the belt driving part so that the conveying belts move in a direction opposite to the conveyance direction, or (Y) in a case of the above (B), the driving control part controls the receiving part switching part so that switching is made from the necessary sheet receiving part to the unnecessary sheet receiving part.

14. The sheet bundle conveying apparatus according to claim 13, wherein in the above (a) of the above (II), when the sheet bundle is sandwiched, a gap is present between the regulating guide and both side end surfaces in the orthogonal direction of the sheet bundle, and/or in the above (b) of the above (II), when the second end surface or the first end surface of the sheet bundle is made to abut on the stopping member of the other of the conveying belts, a gap is present therebetween.

15. The sheet bundle conveying apparatus according to claim 13, wherein in the above (I), the driving control part controls the belt driving part so that all the stopping members of all the conveying belts are aligned in the orthogonal direction.

16. The sheet bundle conveying apparatus according to claim 13, wherein the stopping members have a wide form so that the stopping member abutting on the first end surface of the sheet bundle and the stopping member abutting on the second end surface thereof partially overlap with each other at a dimension in the orthogonal direction when viewed from the upstream side or the downstream side in the conveyance direction.

17. The sheet bundle conveying apparatus according to claim 13, wherein the conveying belts have a plurality of placement areas.

* * * * *